United States Patent [19]

Haggerty

[11] Patent Number: 4,703,318
[45] Date of Patent: Oct. 27, 1987

[54] CHARACTER-BASED MONOCHROMATIC REPRESENTATION OF COLOR IMAGES

[75] Inventor: William T. Haggerty, Groton, Mass.

[73] Assignee: Wang Laboratories, Inc., Lowell, Mass.

[21] Appl. No.: 723,732

[22] Filed: Apr. 16, 1985

Related U.S. Application Data

[63] Continuation-in-part of Ser. No. 595,027, Mar. 30, 1984.

[51] Int. Cl.$^4$ .............................................. G09G 1/00
[52] U.S. Cl. ................................... 346/723; 340/734; 340/731; 340/793
[58] Field of Search ............... 340/703, 793, 729, 734, 340/722, 730, 731, 723, 724, 750, 798, 799; 358/22, 81, 283, 298; 350/162.12

[56] References Cited

U.S. PATENT DOCUMENTS

| | | | |
|---|---|---|---|
| 3,274,909 | 9/1966 | Haverbach | 340/723 |
| 3,604,846 | 9/1971 | Behane | 178/6.6 L |
| 3,781,850 | 12/1973 | Gicca et al. | 340/722 |
| 4,225,861 | 9/1980 | Langdon, Jr. et al. | 340/703 |
| 4,257,070 | 3/1981 | Sommer et al. | 358/282 |
| 4,297,693 | 10/1981 | Parsons | 340/721 |
| 4,352,100 | 9/1982 | O'Connell | 340/750 |
| 4,367,533 | 1/1983 | Wiener | 340/731 |
| 4,386,416 | 5/1983 | Giltner et al. | 364/900 |
| 4,481,529 | 11/1984 | Kealing | 358/30 |
| 4,495,491 | 1/1985 | Postl | 340/730 |
| 4,584,573 | 4/1986 | Ito | 340/721 |

Primary Examiner—Marshall M. Curtis
Attorney, Agent, or Firm—Michael H. Shanahan; Scott K. Peterson

[57] ABSTRACT

Forming a character-based monochromatic image from a digital representation of a color image by (1) forming a character-based representation of the color image in which a plurality of color characters each describe the background and foreground color within a defined area of the color image, (2) providing a plurality of color pattern masks each corresponding to a color in the color image and comprised of a pattern of light and dark dots capable of providing, in the monochromatic image, visual discrimination between areas of different color, (3) transforming the color characters to monochromatic characters by replacing the background and foreground color of each color character with the corresponding pattern of light and dark dots, and (4) displaying the monochromatic characters on a character-based output device (e.g., a CRT display driven by a character-based controller).

16 Claims, 19 Drawing Figures

| | | BASIC MASK | FINAL MASK | GRAPHIC MASK |
|---|---|---|---|---|
| BLACK (00, 00) | 0 0 0 0 0 0 0 0 / 0 0 0 0 0 0 0 0 | 00000000<br>00000000<br>00000000<br>00000000<br>00000000<br>00000000<br>00000000<br>00000000 | |  |
| RED (bb, ee) | b b e e b b e e b b e e b b e e | 10111011<br>11101110<br>10111011<br>11101110<br>10111011<br>11101110<br>10111011<br>11101110 | |  |
| GREEN (cc, 33) | c c 3 3 c c 3 3 c c 3 3 c c 3 3 | 11001100<br>00110011<br>11001100<br>00110011<br>11001100<br>00110011<br>11001100<br>00110011 | |  |
| YELLOW (cc, 00) | c c 0 0 c c 0 0 c c 0 0 c c 0 0 | 11001100<br>00000000<br>11001100<br>00000000<br>11001100<br>00000000<br>11001100<br>00000000 |  11001100<br>00000000<br>00110011<br>00000000<br>11001100<br>00000000<br>00110011<br>00000000 |  |
| BLUE (ff, ff) | f f f f f f f f f f f f f f f f | 11111111<br>11111111<br>11111111<br>11111111<br>11111111<br>11111111<br>11111111<br>11111111 | |  |

GRAPHIC MASK

FINAL MASK

BINARY

HEXADECIMAL

BLACK
(00, 00, 00; 00, 00, 00)

RED
(bb, bb, b0; ee, ee, e0)

GREEN
(cc, cd, c0; 33, 33, 30)

GRAPHIC MASK

FINAL MASK

BINARY

HEXADECIMAL

YELLOW
(99, 99, 90; 00, 00, 00)

BLUE
(ff, ff, f0; ff, ff, f0)

MAGENTA
(bb, bb, b0; 44, 44, 40)

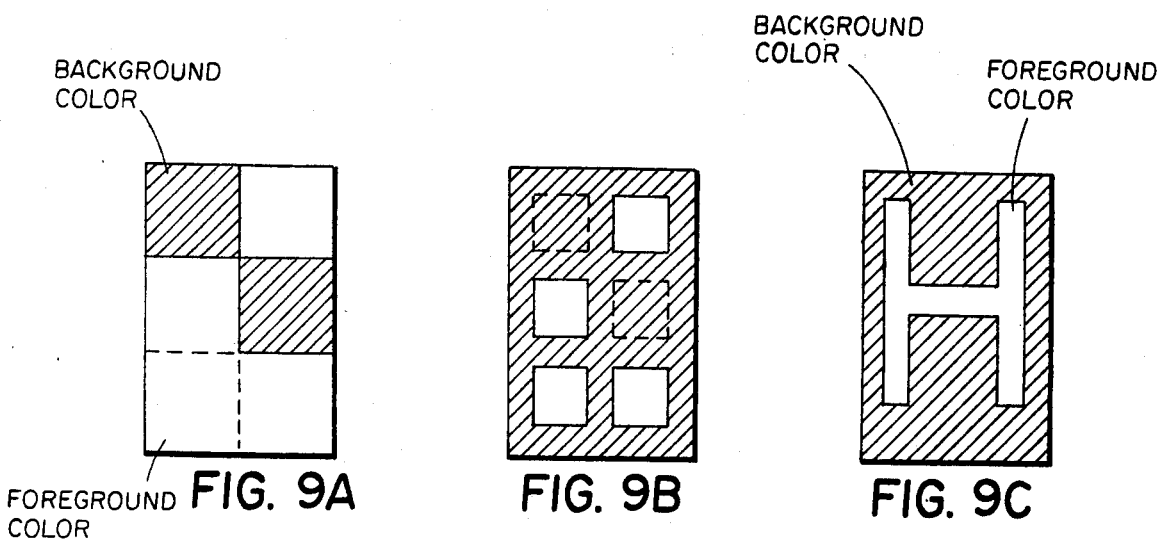
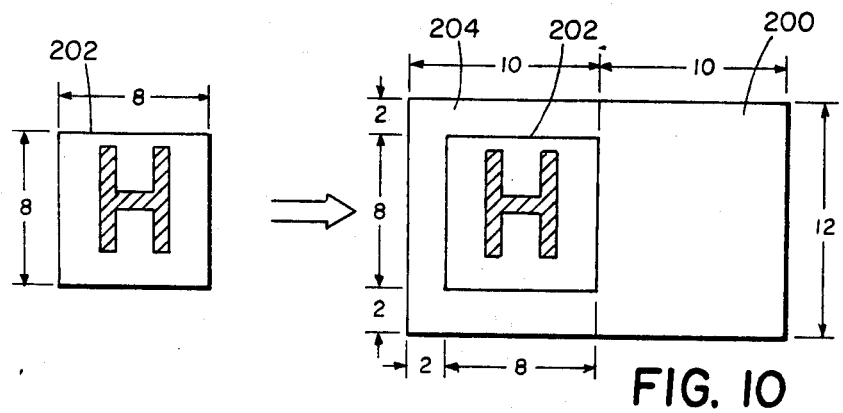
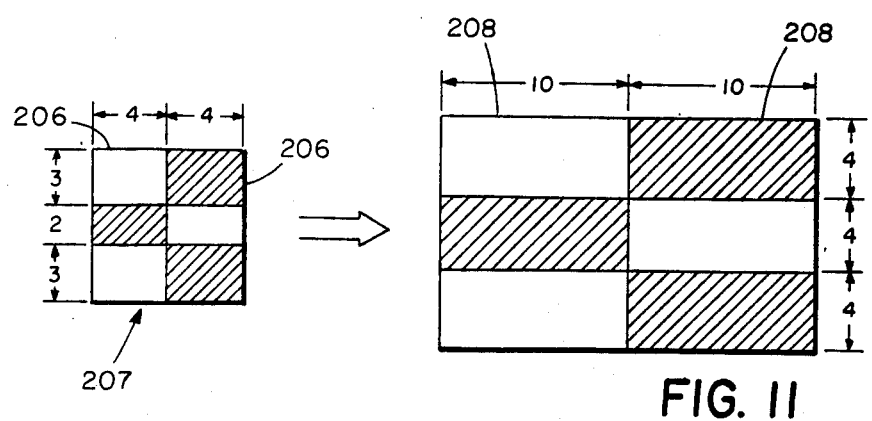

CHARACTER-BASED MONOCHROMATIC REPRESENTATION OF COLOR IMAGES

BACKGROUND OF THE INVENTION

This application is a continuation in part of my co-pending U.S. application Ser. No. 595,027, filed Mar. 30, 1984, entitled Monochromatic Representation Of Color Images, hereby incorporated by reference.

1. Field of the Invention

The present invention relates to the processing and representation of color images and, more particularly, to a method and apparatus for the representation of color images in data processing systems having monochromatic output devices, such as printers and CRT displays. In this context, an image may be defined as a visual representation of information wherein the information may be pictorial or textual or both and may be comprised of alphanumeric characters or symbols or graphic characters, symbols or elements or a combination thereof. A color image may be further defined as an image wherein the elements or areas comprising the image, whether alphanumeric or graphic, are defined by various colors.

2. Prior Art

Many presently available data processing systems, ranging from public data base television type systems (such as the TELETEL and PRESTEL videotex systems), to 'home' computers, to very expensive and complex computer-aided-design (CAD) systems, are capable of manipulating and representing monochromatic and color images. Many systems, however, are wholly or partially limited to monochromatic imagery, either for cost considerations or because image generation and display is a secondary or later added capability of the system. For example, a system may originally have been designed only for monochromatic operations or, while the system itself is capable of operating with color images, the display or hard copy devices connected for the system, such as the CRT and printers, may have only monochromatic capabilities. A recurring problem with systems having image capabilities is presented whenever color images, for example, generated or provided by a system having color image capabilities, are to be visually represented by a system having, for example, only a monochromatic CRT or monochromatic printers. The problem arises when the owner of a personal computer with a conventional 80 column by 24 line monochromatic CRT display desires to communicate with a videotex service (e.g., TELETEL and PRESTEL) that transmits information intended to be viewed on a 40 column by 24 row color display. In general, visual outputs of color images by monochromatic means have proven unsatisfactory, the images being esthetically unpleasing or in many cases visually distorted or transformed to an unacceptable extent.

One basis of the problem is that monochromatic and color processes differ in the information presented to a viewer in order for the viewer to distinguish between areas of an image. That is, color processes distinguish between various areas of an image by both color and shade of color, that is, the lightness or darkness of a color. For example, three areas may be distinguished in that one is red, one is light blue and one is dark blue; the red area is distinguished from the blue areas by color and the blue areas are distinguished by being of differing shades of blue. In monochromatic processes, however, the various areas of an image are distinguished only by shade, generally referred to as 'half tones', ranging from 'black' to 'white'.

A transformation of a color image to a monochromatic image thereby requires that color and shade information contained in a color image be transformed into shade information in a monochromatic image. This results, in present systems, in a loss or distortion of visual information. For example, in the simplest systems the 'dark' combinations of color and shade information from a color image are transformed into a 'black' monochromatic shade while the 'light' combinations are transformed into a 'white' monochromatic shade. The result can be a total distortion of the original color image and at least a loss of visual information and a degradation of visual esthetics.

In more complex systems, the various combinations of color and shade appearing in the color image original are transformed into their nearest equivalent 'gray scale' monochromatic shade. The most common example of such a system is in 'black and white' photography of a colored object, such as a landscape; that is, the various colors and shades appearing in the scene are replaced, in the photograph, by their shade of gray equivalents. While such a system provides less distortion than the simple system described above, there may still be some distortion of the original visual information and often a loss of esthetics. This distortion occurs because many combinations of color and shade have the same 'gray scale' equivalent; for example, a red area, a blue area and a green area, easily distinguishable in color, may have the same gray equivalent and appear as the same shade of gray in the monochromatic image.

It is thereby an object of the present invention to provide an improved method and apparatus for representing color images through monochromatic means.

SUMMARY OF THE INVENTION

In general the invention features forming a character-based monochromatic image from a digital representation of a color image by (1) forming a character-based representation of the color image in which a plurality of color characters each describe the background and foreground color within a defined area of the color image, (2) providing a plurality of color pattern masks each corresponding to a color in the color image and comprised of a pattern of light and dark dots capable of providing, in the monochromatic image, visual discrimination between areas of different color, (3) transforming the color characters to monochromatic characters by replacing the background and foreground colors of each color character with the corresponding pattern of light and dark dots, and (4) displaying the monochromatic characters on a character-based output device (e.g., a CRT display driven by a character-based controller).

In preferred embodiments, each monochromatic character comprises a matrix of pixels and each matrix of pixels is represented in a memory as a corresponding matrix of bits; a color-pattern matrix of bits is provided to represent each color pattern mask, with a bit in one state representing a light dot or a portion thereof and a bit in the other state a dark dot or a portion thereof; there is generated for each color character a foreground-background matrix of bits in which a bit in one state represents the presence of foreground color and a bit in the other state the presence of background color, the foreground-background matrix is combined with the color-pattern matrix of the foreground color in such a manner as to replace the bits in the foreground-background matrix with the bits in the color-pattern matrix in areas of foreground color, and the foreground-background matrix is combined with the color-pattern matrix of the background color in such a manner as to replace the bits in the foreground-background matrix with the bits in the color-pattern matrix in areas of background color; color characters are fewer in number than monochromatic characters and the defined area represented by each color character is larger than the area of the monochromatic image represented by the monochromatic character; the color characters include alphanumeric characters having the foreground color in the body of the character and the background color elsewhere and the transforming step includes the steps of generating for each color character at least two monochromatic characters one of which is a space character (all background), so that the body of the character appears in fewer than all of the monochromatic characters corresponding to the color character; there are two monochromatic characters for each color character and one of the two monochromatic characters is made a space character (all background) and the other contains the body of the alphanumeric character; there are two monochromatic characters for each color character and the color characters include graphical characters of a type having two vertical rows of blocks each of which can be foreground or background color and wherein a first monochromatic character containing one vertical row of blocks is formed and a second monochromatic character containing the other vertical row of blocks is also formed; the color image comprises a videotext image; the character-based output device is capable of displaying no more than a maximum number of monochromatic characters at any one time and wherein a newly generated monochromatic character is compared to a library of earlier generated monochromatic characters already part of the monochromatic image and is added to the library only if the newly generated character is not already present there; the library is a dedicated character memory in circuitry controlling said output device; redundancies (e.g., presence of spaces in portions of enlarged alphanumeric characters) in the monochromatic characters are detected and only one character is added to the library instead of one for each redundant character; fewer color pattern masks are provided than there are colors in the color image and each color for which no pattern mask is provided is represented as the inverse of one of the patterns by instructing the output device to display a character containing that color in a reverse video manner; color characters containing both a color for which there is a color pattern and colors for which an inverse of a pattern is required are transformed into monochromatic characters by doing the inversion of color pattern during the process of substituting the color patterns for the foreground and background areas of a character.

In another aspect of the invention, the color pattern masks used are those given in the tables in the text of the specification.

Other features and advantages of the invention will be apparent from the following description of preferred embodiments and from the claims.

BRIEF DESCRIPTION OF THE DRAWINGS

FIGS. 9A, 9B and 9C are illustrations of typical videotext graphical and alphanumeric characters.

FIGS. 10 and 11 show the enlargement that the graphical and alphanumeric videotext characters undergo for display on an 80-column CRT.

DESCRIPTION OF PREFERRED EMBODIMENTS

The following description will first briefly present the general structure and operation of the hardware and software of a computer system incorporating the present invention and capable of performing image processing and display operations and of communications operations, including communications of images. The structure and operation of such a system will be well understood, as presented herein, by one of ordinary skill in the art and further details of the structure and operation of such a system are presented in U.S. patent application Ser. No. 440,668, filed Nov. 10, 1982 and incorporated herein by reference. The specific system selected for illustrative purposes is a Wang "Professional Computer" available from Wang Laboratories, Inc., Lowell, MA 01851. Having presented a context, that is, apparatus in which to practice the invention, the color to monochromatic image transformation method of the present invention will then be described in detail.

The following will then describe an exemplary color image system which may be used as source of color images to be transformed by the above described data processing system. The color images and system described therein are representative of many other commonly used color image systems which may be sources of color images to a system as described above. Other sources of color images, such as color graphic computer systems, may also serve as sources of color images, as may the exemplary system described in the present patent application. In the latter case, the color transformation of the present system may be used, for example, to transform a color image generated by a system when a monochromatic printer connected from the source system is used to provide a hard copy of images created therein.

The color transformation of the present invention may be used in relation to videotex systems such as TELETEL and PRESTEL. PRESTEL is a public data base television type system used in the United Kingdom; PRESTEL is a trademark of the British Post Office for PRESTEL services. PRESTEL is presently used, for example, to selectively distribute, under viewer control, information of interest to the public from a central PRESTEL data base. The information contained in this data base may pertain, for example, to weather and stock market reports and shopping guides and entertainment guides. The information so provided is primarily in the form of color images containing both text, that is, alphanumeric characters and symbols, and graphic or pictorial elements.

1. COMPUTER SYSTEM STRUCTURE AND OPERATION

Figure 1:
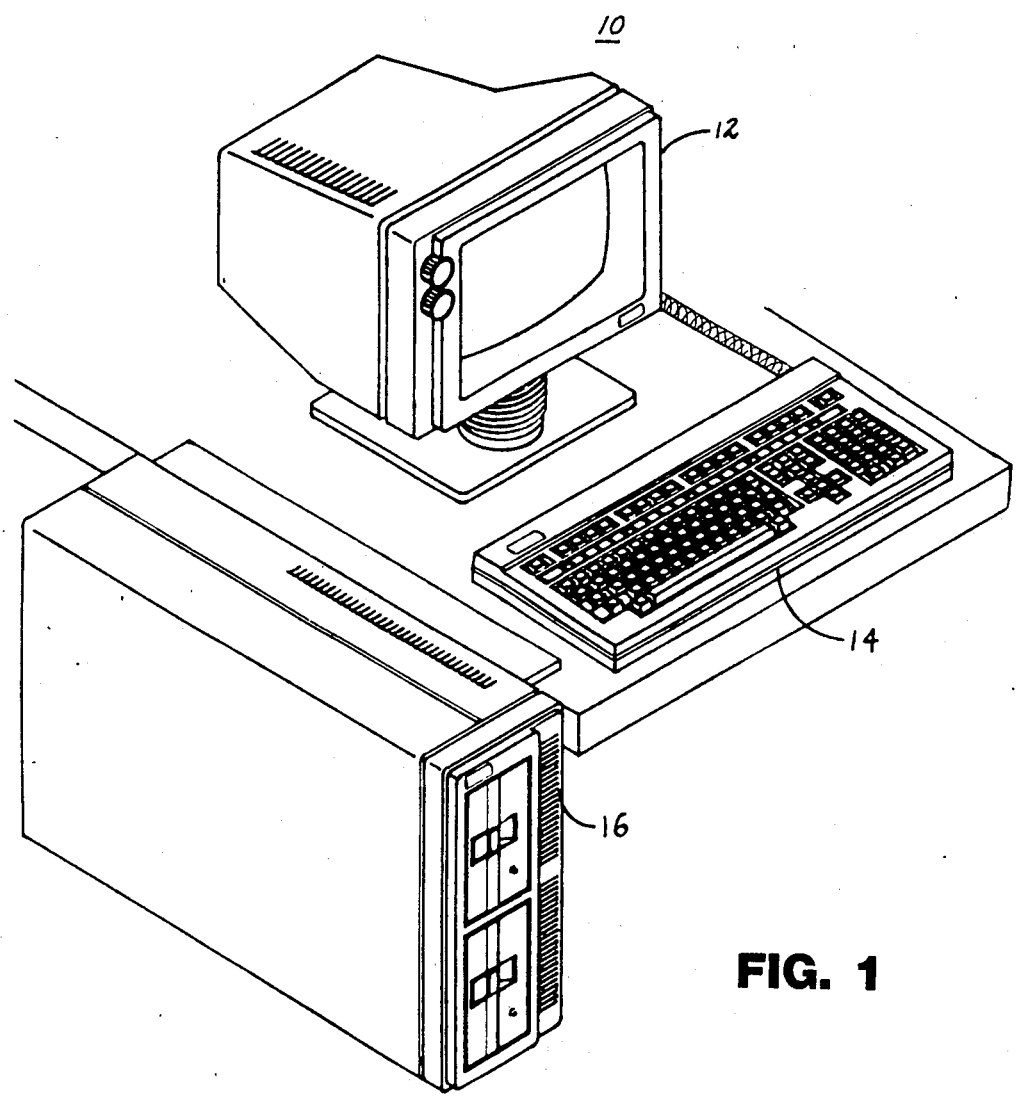
FIG. 1 is an isometric view of a computer system incorporating the present invention.

Referring to FIG. 1, an isometric view of the computer system is shown. System 10 includes a Display 12, a Keyboard 14 and a Central Processing Unit (CPU) 16. Display 12 and Keyboard 14 are the primary means by which information, for example, text, is communicated between the system and a user. CPU 16, which is connected to Display 12 and Keyboard 14 by cables which are not shown, includes a memory for storing programs and data and a general purpose arithmetic and logic unit (ALU). CPU 16 may further include disc drives for storing programs and data and interfaces to peripheral devices, such as printers, disc drives and telecommunications devices. As described above, System 10 may be comprised, for example, of a "Professional Computer" available from Wang Laboratories, Inc., Lowell, MA 01851.

A. Hardware Structure and Operation a. ALU and Busses

Figure 2A:
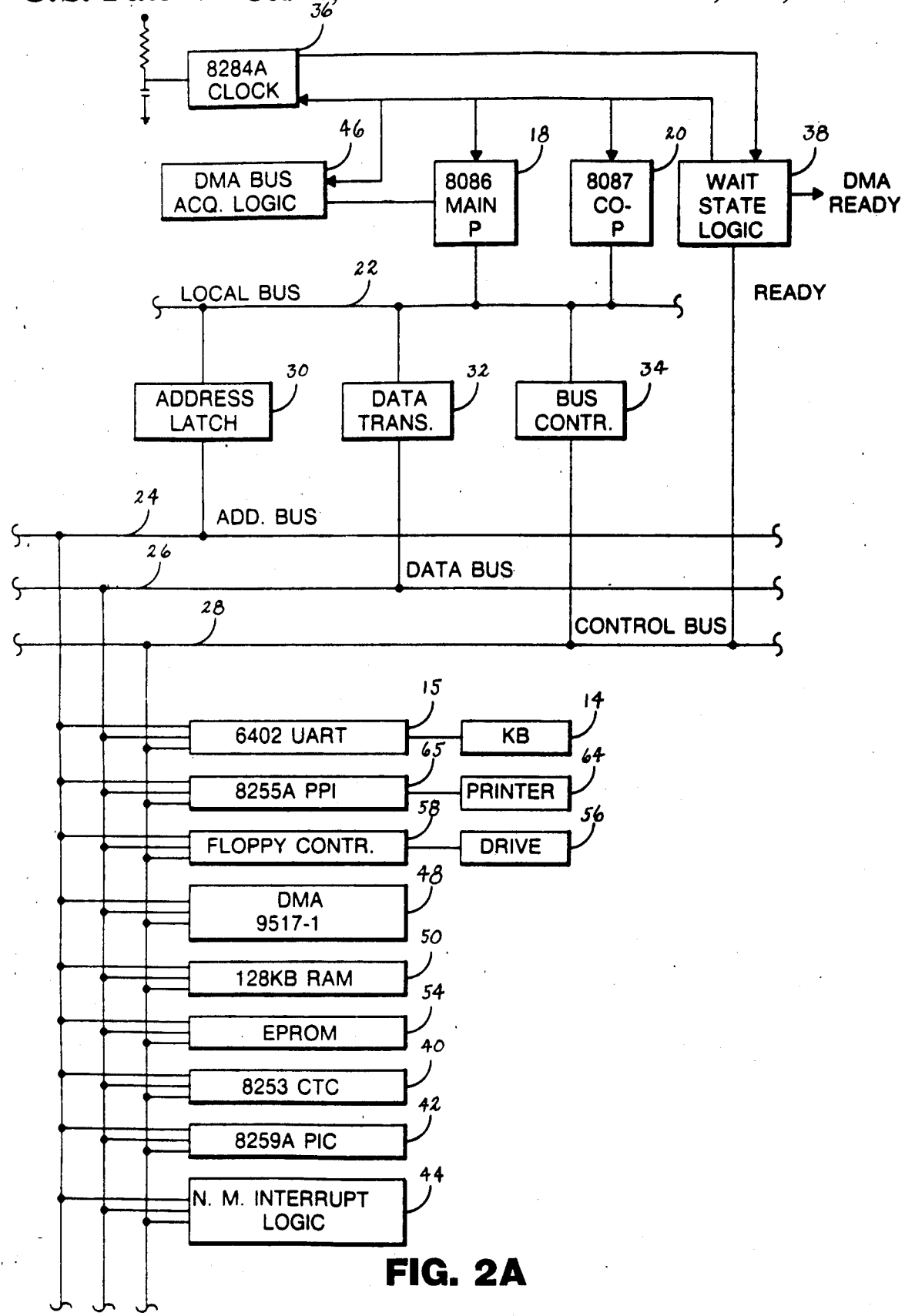
FIGS. 2A and 2B are a block diagram of the computer system of FIG. 1.
Figure 2B:
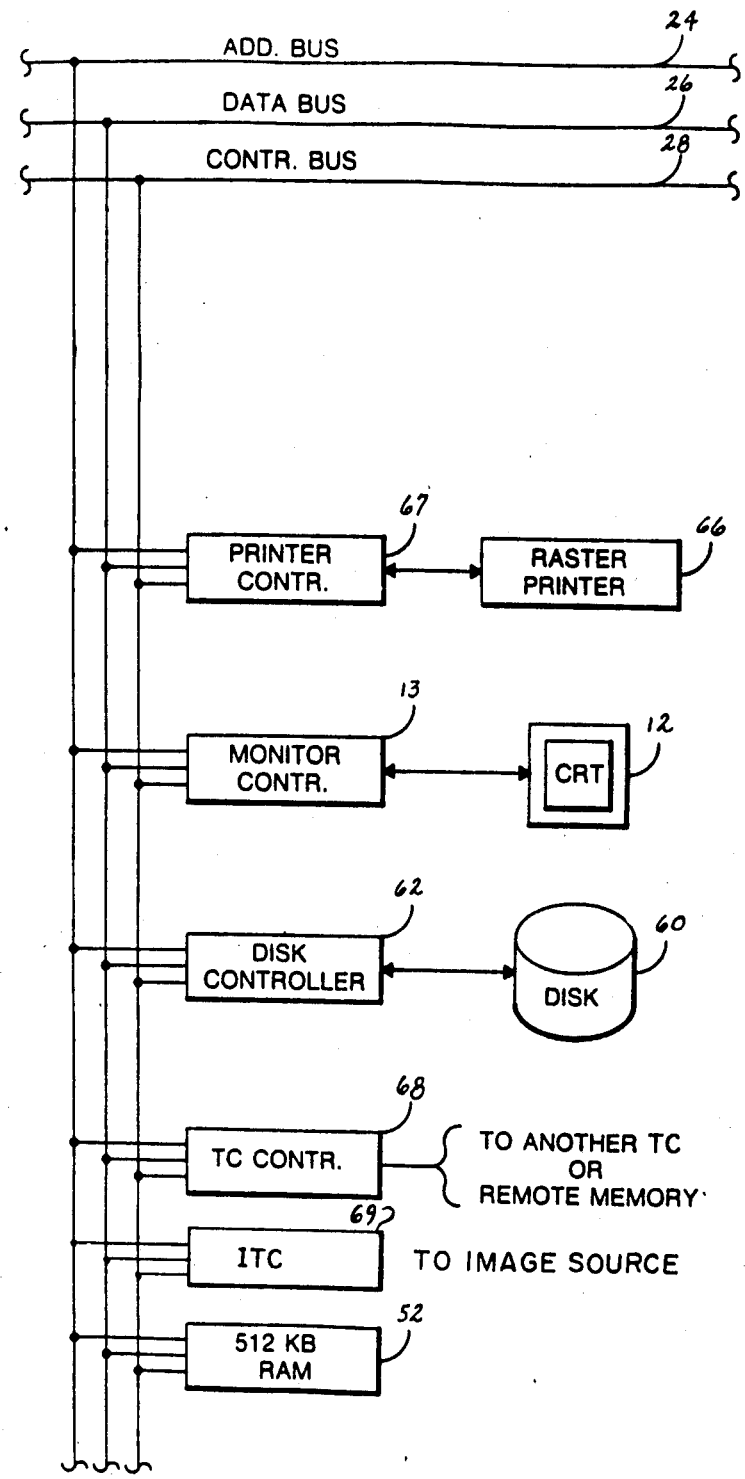

Referring to FIGS. 2A and 2B, a block diagram of System 10 is shown. System 10's ALU in CPU 16 is comprised of a Main Processor (Main P) 18 and a Co-Processor (CO-P) 20. Main P 18 and CO-P 20, may, for example, respectively be a 16 bit Intel 8086 ALU and an Intel 8087 numerics processor extension. Main P 18 and CO-P 20 perform all arithmetic and logic operations for CPU 16, including addressing, memory references, and control of Input/Output (I/O) operations.

Main P 18 and CO-P 20 communicate through Local Bus 22 and with the remainder of CPU 16, Display 12, Keyboard 14 and all peripheral devices through Address Bus 24, Data Bus 26 and Control Bus 28. The interface between Main P 18 and CO-P 20 and Busses 24, 26 and 28 is through Address Latch 30, Data Transceiver 32 and Bus Control 34.

b. Internal Control Logic

Referring next to CPU 16's internal control logic, associated with Main P 18 and CO-P 20 are System Clock 36 and Wait State Logic 38. System clock 36 is the source of all clock timing signals for CPU 16. Wait State Logic 38 essentially monitors the operations of CPU 16 and issues control signals, to System Clock 36 and to other elements of CPU 16 through Control Bus 28, to prevent conflicts in CPU 16 operations.

Other of CPU 16's control elements include Counter and Timer Chip (CTC) 40 and Programmable Interrupt Chip (PIC) 42. CTC 40 may, for example, be an Intel 8253 and PIC an Intel 8255A. Non-Maskable Interrupt Logic 44 operates in conjunction with PIC 42 to handle interrupt conditions which must be handled immediately, that is, which cannot be masked for later action. Such interrupt conditions include parity and I/O errors.

CPU 16 is capable of performing both mapped memory references and Direct Memory Access (DMA) operations between CPU 16's memories, described below, and, for example, System 10's peripheral devices. DMA operations are controlled by DMA Bus Acquisition Logic 46 and DMA Control (DMA) 48. DMA Acquisition Logic 46 monitors the operation of System 10, in particular memory and bus operations, and issues DMA grant signals on Control Bus 28 when DMA operations may be executed. DMA 48 detects requests for DMA operations, for example, from peripheral devices, informs DMA Bus Acquisition Logic 46 of the presence of such requests, and controls DMA operations when DMA Bus Acquisition Logic 46 grants access to CPU 16's busses.

c. Memory

CPU 16's primary internal memory is 128 KB Random Access Memory (RAM) 50, which is used to store operating system and applications programs and data, such as images, to be operated upon. The operating system program may, for example, be comprised of the commercially available Micro Soft Disk Operation System from Micro Soft Corporation (note: MSDOS is a a tradename of Micro Soft Corporation) and may include the Basic Input and Output System (BIOS). MSDOS essentially controls the executive internal operations of System 10 while BIOS comprises programs controlling the interface between System 10, Display 12 and Keyboard 14 and a wide range of peripheral devices.

Where necessary, the capacity of 128 KB RAM 50 may be augmented by the addition of 512 KB RAM 52. 512 RAM 52 is connected from Address Bus 24, Data Bus 26 and Control Bus 28 in parallel with 128 KB RAM 50 and operates in parallel with and effectively as a part of 128 KB RAM 50.

Erasable Programmable Read Only Memory (EPROM) 54 stores and provides programs used to load the operating system and application programs described above from diskettes in Disc Drive 56 and into 128 KB RAM 50 and 512 KB RAM 52.

As indicated in FIG. 2A, Disc Drive 56 is connected from Address Bus 24, Data Bus 26 and Control Bus 28 and is controlled by Floppy Controller 58. In addition to storing and providing operating system and applications programs, Disc Drive 56 may be used as additional memory capacity augmenting 128 KB RAM 50 and 512 KB RAM 52 and may be used to store and load data, such as text to be operated upon. In this regard, Disc Drive 56 may be used as an I/O device, for example, to transfer text or data from one system to another on diskette.

The capacity of Disc Drive 56 may be augmented by the addition of Winchester Hard Disc Drive 60 and Disc Controller 62, which are connected from Address Bus 24, Data Bus 26 and Control bus 28 in parallel with Disc Drive 56 and RAMs 50 and 52. Hard Disc Drive 56 may be used as an extension to RAMs 50 and 52, for storing programs and data to be operated upon.

d. I/O Devices

As previously described, Display 12 and Keyboard 14 are the primary I/O means for communication between System 10 and a user. Display 12 may be a conventional monochromatic CRT display connected to Address Bus 24, Data Bus 26 and Control Bus 28 through Monitor Control 13 and Monitor Control 13 may, for example, be a Nippon Electric Corporation uPD 7220 Graphic Data Controller. Alternately, Display 12 may be a color display in those system wherein color capability is desired and the appropriate software run and Monitor Control 13 would be a color monitor driver. In yet other alternatives, Monitor Control 13 may comprise either a 'character set graphics' display driver or a 'bit map' display driver, or both, as described further below. Keyboard 14 is a conventional keyboard having an internal microprocessor, for example a Zilog Z80, for controlling keyboard operation and data/control communications between Keyboard 14 and system Busses 24, 26 and 28 through Universal Asynchronous Receiver/Transmitter (UART) 15. Other I/O devices include Printers 64 and 66. Printer 64 may, for examplle, be a conventional daisy wheel or dot matrix type printer. Printer 66 may, for example, be a thermographic printer for graphics printing, such as a Microplot 80 available from Gulton Industries, Inc. of East Greenwich, RI 02818.

Finally, communication between System 10 and other systems or devices is provided through Telecommunications Controller (TC) 68. TC 68 is a microprocessor controlled interface device, incorporating, for example, a Zilog Corporation Z80 microprocessor and serial I/O chip, for communication between system busses 24, 26 and 28 and communications modems or external devices, such as memories and displays. In the alternative, and specifically in the exemplary system described below, System 10 may further include an Image Telecommunications Controller (ITC) 69 specifically for communications of image data. In the present example, ITC 69 may be a PRESTEL decoder for receiving PRESTEL images and, in other embodiments, may be decoders/receivers for other color image transmission systems. IC 68 may, of course, also be used to transmit and receive image data.

It should be noted that the System 10 described above is exemplary and that the image transformation method described below may be implemented, for example, on a variety of system architectures. The method may, for example, be implemented on a processor based upon Zilog Z80, Motorola MC68000, Intel 8080 or 80186, or National Semiconductor NS16000 microprocessors, upon a minicomputer or mainframe computer, or upon a word proccessor or communictions processor. Having described the structure and operation of System10's hardware, the software structure and operaton of System 10 will be described next below.

B. Software Structure and Operation

Figure 3:
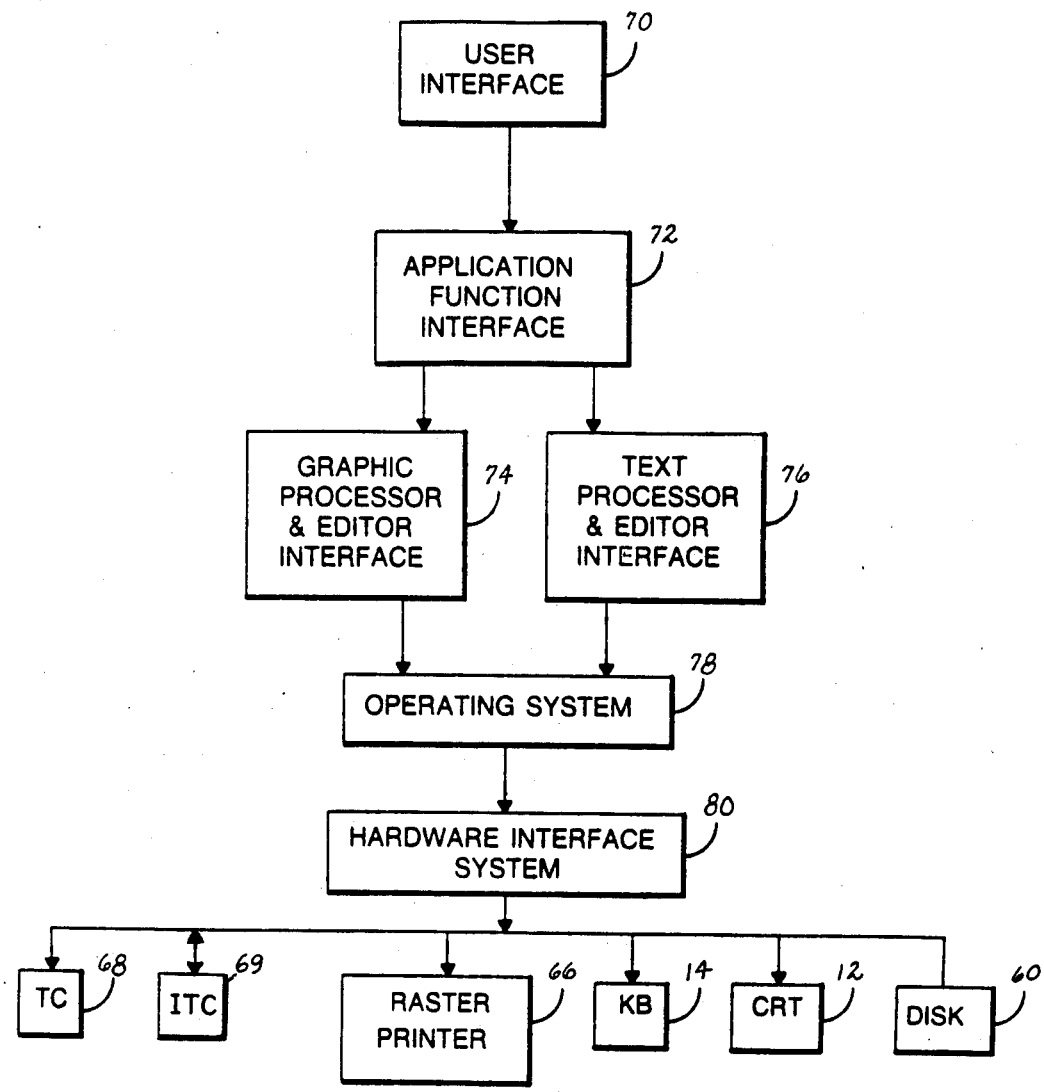
FIG. 3 is a diagrammic representation of the software structure of the computer system of FIGS. 1, 2A and 2B.

Referring to FIG. 3, a diagrammic representation of System 10's software structure is shown. As indicated therein, the system software structure is a multilayered structure for transforming user actions into specific, detailed operations by the system hardware. The software structure includes elements for interfacing with the user at the upper layers and with the system hardware elements at the lower layers. The middle layers essentially transform user commands and requests into instructions directing the operations of the hardware.

Beginning at the user interface level, routines 70, 72, 74 and 76 comprise the system's application programs and determine and direct the specific applications operations performed by the system, for example, image or graphics editing and display or data processing.

User Interface Routines 70 include all routines for interacting with the user by means of, for example, Display 12, Keyboard 14 and the system discs and printers. While User Interface Routines 70 are oriented towards the user, Application Function Interface Routines 72 interface between the user action operations as performed by User Interface Routines 70 and the user action operations as performed by User Interface Routines 70 and the software which performs the actual application operations, such as image editing and display. Essentially, Applcation Function Interface Routines 72 transform the results of the user interface operations into instructions and commands for directing the application operations specified by the user.

Applications Routines 74 and 76 are the actual applications programs, that is, the programs directing the system to perform, for example, image or graphics editing or display operations or data processing operations. Applications Routines 74 and 76 receive direction for Application Function Interface Routines 72 regarding what operations have been requested by the user and provide instructions to Operating System 78 as to what system operations must be performed to execute the requested operations.

As previously described, Operating System 78 may be comprised of MSDOS and includes all routines necessary for executive control of the system. Operating System 78 in turn interfaces with Hardware Interface System 80, which is comprised of BIOS, previously described. Essentially, Operating System 78 determines what detailed operations must be performed by the system to carry out the operations requested by the user and provides corresponding instructions to Hardware Interface System 80. Hardware Interface System 80 in turn responds by providing detailed commands to the various elements, previously described, comprising System 10's hardware structure.

2. COLOR TO MONOCHROMATIC IMAGE TRANSFORMATION

It should be noted for the purposes of the following descriptions that, in most systems, the various color areas of color images are essentially comprised of arrays of dots wherein each dot is of a particular color. The transformation of a color image into a monochromatic image is performed by replacing the color dot array in each area of the image with a corresponding dot array of monochromatic 'on' and 'off' dots.

As previously described, the color to monochromatic image transformation of the present invention transforms each color area of the original image into a corresponding area of the monochromatic image having a particular pattern of 'light' and 'dark' dots corresponding to and representing the original color of the area. The dot patterns are selected to provide both gray scale representations of the original colors and differing textural appearances for each color, so as to maximize the discrimination, or distinction, between the areas of the monochromatic image. That is, the transformation of the present invention provides an approximation to gray scale representation, in the overall gray scale appearance of the dot patterns, but adds an additional dimension of texture. It should be noted, in this regard, that the monochromatic dot patterns of the present invention do not necessarily correspond exactly to the colors or gray scale values of the original colors, but are selected to provide visual impressions analogous to the visual impressions provided by the corresponding original colors.

A further feature of the dot arrays selected to represent various colors is that the patterns of dots are selected for each array so as to avoid the creation of artifacts, that is, the formation of accidental or incidental patterns and figures within a given array or at the junction or border between two arrays.

It should be further noted, for the purposes of the following description, that in both color CRT and color printer type displays, the dots in a particular color will be 'on' and of appropiate color to generate an area of the chosen shade of that color. The sole exceptions are for the colors 'black' and 'white'. In a CRT display, 'black' dots are usually represented by turning the 'black' dots 'off', so that the background color or the CRT screen is used as 'black', while 'white' dots are 'on'. In printers, 'white' dots are 'off', so that the natural color of the page is used as 'white', while 'black' dots are 'on' and result in the printing of a dot on a page. Monochromatic CRTs and printers, however, use combinations of 'on' and 'off' dots, that is, of dark and light dots, to provide various shades of 'gray' within given areas. The following descriptions will be based upon the conventions used in printers, that is, 'on' dots provide corresponding colored or 'dark' dots while 'off' dots provide corresponding 'white' or 'light' dots. The following invention is not limited, however, to printer systems, but is equally applicable to CRT type systems. in this regard, the transformation of the following descriptions from printer convention to CRT convention will be well understood by those of ordinay skill in the art.

The following will first describe an exemplary color image system which may be used as source of color images to be transformed by the above described data processing system. The color images and system described therein are representative of many other commonly used color image systems which may be sources of color images to a system as described above. Other sources of color images, such as color graphic computer systems, may also serve as sources of color images, as may the system itself described above. In the latter case, the color transformation of the present system may be used, for example, to transform a color image generated by the system when a monochromatic printer connected from the system is used to provide a hard copy of images created therein.

A. Exemplary Image Source Color System

In the PRESTEL or TELETEL videotex systems character-set graphics are used to create images. That is, each image is comprised of an array of 'characters' wherein each character is comprised of an alphanumeric character or symbol or a graphic symbol, the graphic symbols being used as 'building blocks' to create pictorial or graphic images or portions of images. A typical image may be comprised, for example, of a 40 character wide by 24 character high array and may include both alphanumeric and graphic characters in any arrangement.

A single character, in turn, is comprised of an array of dots and may typically be, for example, 8 dots wide by 8 dots high or 20 dots wide by 16 dots high. In the PRESTEL convention, which is common in character set graphic systems, certain dots of a character are 'on' to represent the 'foreground' portions of the symbol represented y the character while the dots which are 'off' represent the 'background' portions of the symbol. The library of characters, alphanumeric, symbolic and graphic, which may be used to create an image in the PRESTEL system are shown in TABLE 2A of the PRESTEL Appendix filed of record in parent U.S. Pat. No. 4,688,031. The TELETEL library is quite similar.

In both TELETEL and PRESTEL, an image is transmitted from the supplier data base to a user in the form of a sequence of 'character codes', which may be control codes, alphanumeric symbol characters or graphic characters and are decoded by the receiver to generate the color image. Within the information contained therein is information defining, for each character position, the colors of the foreground and background portions of the character to be displayed there.

B. Image Generation to Screen or Printer

The most common image display devices, for example, CRT displays and printers, are dot matrix devices; that is, an image is written onto the screen or page as rows of dots and in many printers, the dots are written onto the screen or page in a raster scan manner, that is, the dots are written one row at a time. In certain dot matrix printers, however, blocks of dots may be printed as entities, that is, as complete characters in character set graphic systems. Yet other printers print in the form of 8 dot columns, the columns then comprising the image.

The systems which generate and provide the images to the display devices may be character set systems, such as the videotext services TELETEL or PRESTEL. In character set systems, the image is usually stored in memory in the form of character codes, wherein a particular block of character codes defines a corresponding row of characters appearing in an image. In certain printers, for example, the symbol character codes defining the image are used to generate corresponding printer codes driving the printer, which performs a symbol code to image conversion.

C. Color Pattern Masks

Figure 4A:
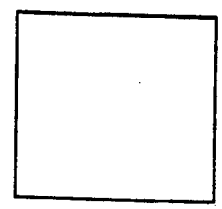
FIGS. 4A and 4B are a representation of 8 by 8 color pattern masks for the colors black, red, green, yellow, blue, magenta, cyan and white.
Figure 4A:
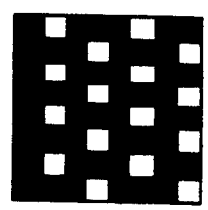
Figure 4A:
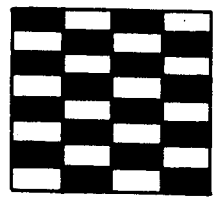
Figure 4A:
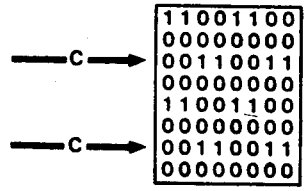
Figure 4A:
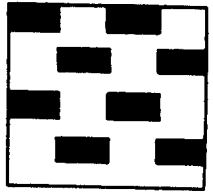
Figure 4A:
Figure 4B:
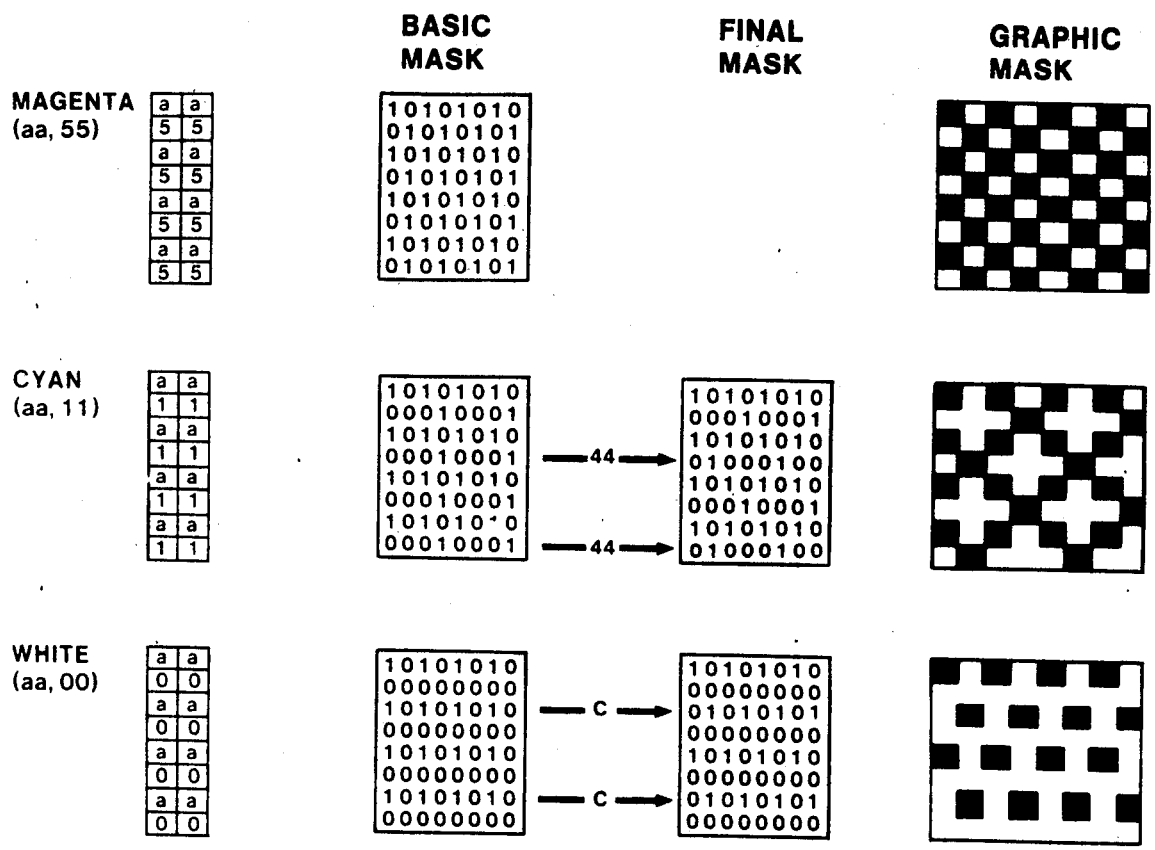

Referring to FIGS. 4A and 4B, the monochromatic dot arrays, or color pattern masks, for the colors black, red, green, yellow, blue, magneta, cyan and white for 8 by 8 arrays are shown. Each array is presented in three forms, as a hexidecimal representation of the array, as a binary bit pattern, and as an array of dark and light dots. In the present application, an 'on' dot coresponds to a binary "1" bit and is represented as a darkened dot while an 'off' dot correponds to a binary "0" and is represented by a light dot. As previously described, this convention was selected as corresponding to the monochromatic printout provided by a printer, wherein a "1" or 'on' dot of a dot matrix provides a printed dot on a page and a "o" or 'off' dot is not printed and provides a light dot. In a representation for a CRT display, the light and dark dot arrays could be reversed; that is, an 'on' or "1" dot would provide a light dot on the screen while an 'off' or "0" dot would be a dark dot.

Referring first the the hexidecimal representations of the dot arrays, that is, color pattern masks, each hexidecimal representation of an array contains four hexidecimal characters, for example, the color pattern mask for magenta is represented by (aa,55). As is well known, a single hexidecimal character represents a four bit binary number; for example, 'a' represents the binary number 1010, or 10, while 5 represents 0101, or 5. Two hexidecimal characters are thereby sufficient to represent one 8 dot row of a color pattern mask.

Each color pattern mask in FIGS. 4A and 4B is represented by two pairs of characters separated by a comma. The leftmost pair, for example, aa, represents the 8 bits of all even numbered rows of the color pattern mask, for example, rows 0, 2, 4, 6 and 8, counting from the top, while the rightmost pair, 55, represents the 8 bits of the odd numbered rows, for example, 1, 3, 5 and 7. Thus the even numbered rows of the color pattern mask for magenta will be comprised of the bit pattern 10101010 and the odd numbered row will be comprised of the pattern 01010101.

As described above, each color pattern mask for the colors shown is then shown in binary bit form, and finally as a color pattern mask of light and dark dots. Finally, it should be noted that the dot pattern of certain rows of certain color pattern masks have been further modified. In particular the 2nd and 7th rows of yellow and white are modified by complementing the bits in the basic pattern and the 3rd and 8th rows of cyan have had the pattern (44) substituted for the original pattern. This modification is performed to result in the final dot patterns of the color pattern masks shown in the rightmost column for each of these colors. The color pattern masks for yellow, cyan and white are created in this manner because, in certain systems, it is most convenient and efficient to store and operate with color pattern masks represented in a uniform format, for example, a matrix of hexidecimal numbers. The modifications to provide the final color pattern masks may then be performed in conjunction with the transformation of the color images. For example, in a character set graphics system wherein the color transformation is performed a scan row at a time, the row (44) is read for the 3rd and 8th rows of the cyan color pattern mask, rather than the (11) or (aa) stored in the color pattern mask matrix, and the bits of the 2nd and 7th rows of the yellow and white color pattern masks are complemented as the 2nd and 7th rows are read from the color pattern mask matrix.

Referring to FIGS. 5A, 5B and 5C, 20 by 16 color pattern masks for the same set of colors are shown in the same manner as in FIGS. 4A and 4B. It should first be noted that in this case the hexidecimal representations of the color pattern masks are again comprised of two sets of hexidecimal characters separated by a semicolon, the left set representing even numbered rows of the color pattern mask and the right set representing the odd numbered rows. Each set is comprised of 6 hexidecimal characters divided into three pairs of hexidecimal characters, each pair representing 8 bits, or one byte, of the row dot pattern. Although the masks are 20 dots wide, most systems prefer to operate with whole bytes or pairs of nibbles, that is, half bytes; as such, the hexidecimal representations of the rows contain information for 24 bits, or dots, that is, three bytes. It should be noted, however, that in the hexidecimal representations of each mask the last hexidecimal character, or last four bits or dots, of each row representation are set to hexidecimal 0, that is, the bit pattern 0000. These portions of the hexidecimal representation information are not used in generating the color pattern masks or in transforming colors into monochromatic dot patterns, so that the color pattern masks are effectively 20 dots wide.

It should be further noted that the 20 by 16 color pattern mask dot patterns differ from the 8 by 8 color pattern mask dot patterns, although providing the same analogous color representations as is achieved by the 8 by 8 color pattern masks. This difference is provided to allow color representation to be achieved in printers having a 20 by 16 dot character capability and in printers which print in a 'double density' mode. In the double density mode, the characters, images or color pattern masks are effectively compressed by a factor of two in the horizontal axis when printed. That is, the second column of a character is printed a partial column separation from the first column to comprise the first printed column, the fourth column of the character is printed a partial column separation from the third column to comprise the second printed column, and so on.

The methods by which color pattern masks are used in transforming color images into monochromatic images are described below.

D. Transformation of Color Images to Monochromatic Images

Figure 6:
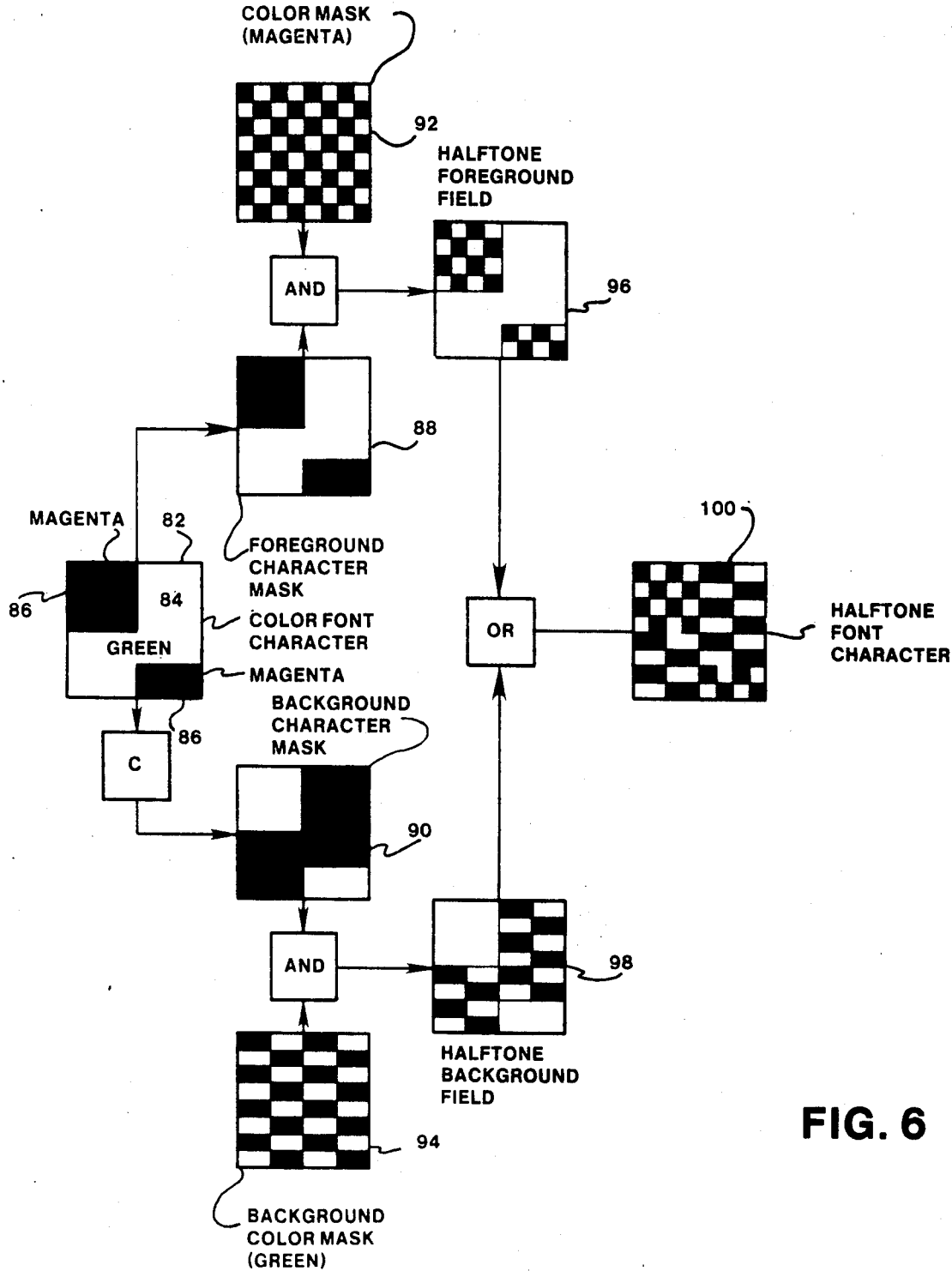
FIG. 6 is a diagrammatic illustration of the color to monochromatic image transformation method of the present invention.

As described above, the transformation of a color image into a monochromatic image is performed by replacing the color in each area of the color image with the monochromatic dot pattern of the corresponding color pattern mask described above. The image transformation process is illustrated in FIG. 6, using a graphic symbol as an example. As previously described, the convention is followed in the present application of indicating 'on' dots as dark dots and 'off' dots as light dots as would result from a printed image, the "dots" being shown as unit squares in the character and mask arrays. Also as previously described, this convention could be reversed for the case of a CRT display. The process may be executed in a similar manner for all symbols or alphanumeric characters and for any color pattern mask or font characters size or proportions, the present illustration being exemplary only.

Referring to FIG. 6, the symbol to be transformed, referred to as Color Font Character (CFC) 82, is shown as comprised of an 8 by 8 array wherein the Background Field (BF) 84 color is green and the Foreground Field (FF) 86 is comprised of a 4 by 4 magenta square in the upper left corner and a 2 by 4 magenta rectangle in the lower right corner.

In the first step of the process, foreground and background character masks are generated, the foreground character mask representing the area of foreground color (magenta) by its 'on' dots and the background character mask representing the area of background color (green) by its 'on' dots. In this step, CFC 82 is used directly to comprise Foreground Character Mask (FCHM) 88 wile CFC 82 is complemented (C) to generate Background Character Mask (BCHM) 90. In FCHM 88 and BCHM 90 the 'on', or dark dots, represent those portions of the original image CFC 82 which were occupied by the foreground and background colors, respectively.

FCHM 88 and BCHM 90 thereby respectively represent those portions of the original image CFC 82 which were occupied by respectively the foreground and background colors.

In the second step of the process, FCHM 88 and BCHM 90 are logically ANDed, dot by dot, with, respectively, Foreground Color Pattern Mask (FCOM) 92 and Background Color Pattern Mask (BCOM) 94 to generate respectively Halftone Foreground Field (HFF) 96 and Halftone Background Field (HBF) 98. FCOM 92 and BCOM 94 are selected from the library of color pattern masks previously described with reference to FIGS. 4A and 4B and FIGS. 5A, 5B and 5C.

HFF 96 and HBF 98 represent, respectively, the foreground and background color areas of the original CFC 82, but with the foreground and background areas filled in with, or transformed, to contain the color pattern mask dot patterns corresponding respectively to the original foreground and background colors.

In the final step of the process, HFF 96 and HBF 98 are logically ORed, dot by dot, to generate Halftone Font Character (HFC) 100. HFC 100 is identical to original CFC 82, but with the original foreground and background colors of CFC 82 replaced, or transformed into, the bit patterns of the corresponding color pattern mask dot patterns. HFC 100 is thereby the monochromatic equivalent, in terms of visual impression, of color image CFC 82.

The above description of the color to monochromatic transformation of a character of an image has been illustrated in FIG. 6 in a graphic manner. In most systems, the transformation will be performed in a raster scan manner, one raster scan line at a time.

To illustrate, the original image may, for example, be comprised of 24 rows of character similar to CFC 82 with each row containing 40 such characters and each character comprised of an 8 by 8 array of dots of foreground and background color. In a scan line operation, the top row of each of the characters in the top row of the image would be read in sequence a dot or group of dots at a time, and used directly or in complemented form a dot at a time as the FCHMs 88 and BCHMs 90 of the top row of dots of the image. These dot by dot FCHMs 88 and BCHMs 90 would be dot by dot logically ANDed with the top row of dots of the appropriate FCOMs 92 and BCOMs 94 for each color to generate, dot by dot, the top row of the corresponding HFFs 96 and HBFs 98 which would, again dot by dot, be ORed to generate, a bit at a time, the top row of the HFCs 100 of the final monochromatic image.

This operation would be repeated for each row of dots of each row of characters, using the appropriate rows of the color pattern masks, until the entire image is transformed. To illustrate for a single character, and using the example of FIG. 6, the dot by dot representation of the top row of FCHM 88 and BCHM 90 are respectively, 11110000 and 00001111 while the dot by dot representation of the top rows of FCOM 92 and BCOM 94 are, respectively, 10101010 (aa) and 11001100 (cc). FCHM 88 top row is bit by bit ANDed with FCOM 92 top row to create HFF 96 top row 10100000 and BCHM 90 top row ANDed with BCOM 94 top row to create HBF 98 top row 00001100, which are ORed to create HFC 100 top row 10101100. For the second row of the character, FCHM 88 and BCHM 90 are respectively again 11110000 and 00001111 while the second rows of FCOM 92 and BCOM 94 are respectively 01010101 (55) and 00110011 (33). The second rows of HFF 96 and HBC 98 are respectively 01010000 and 00000011 and the second row of HFC 100 is 01010011, and so on until the image is completed.

It should be noted that, as previously described, certain rows of certain color pattern masks are modified from the dot patterns expressed in the hexidecimal matrix representations of the color pattern masks. For example, dot patterns of the 3rd and 7th rows of the cyan color pattern mask, that is, the 4th and 8th rows counting from the top row, are expressed as (44) rather than the (11) entered in the matrix representations. In such cases, the pattern 01000100 (44) would be used at this row in the transformation, rather than the matrix expression (11).

Figure 5A:
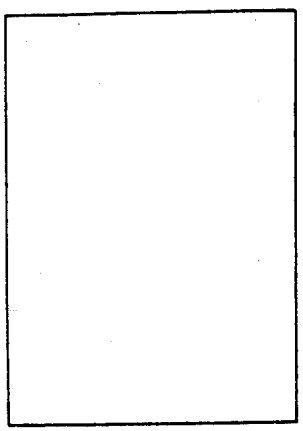
FIGS. 5A, 5B and 5C are a representation of 20 by 16 color pattern masks for the colors black, red, green, yellow, blue, magenta, cyan and white.
Figure 5A:
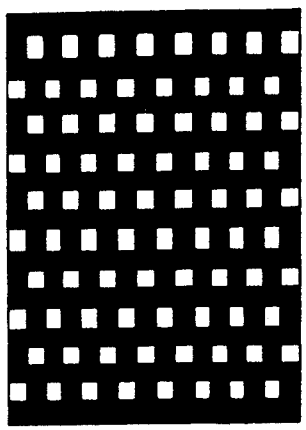
Figure 5A:
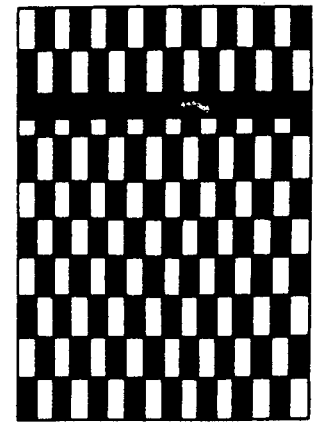
Figure 5A:
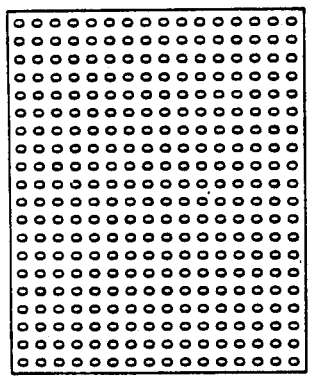
Figure 5A:
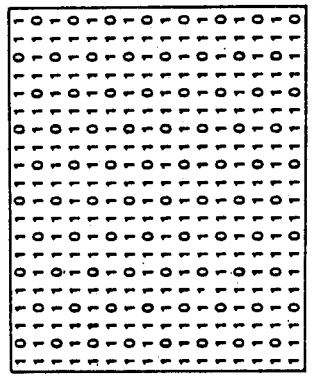
Figure 5A:
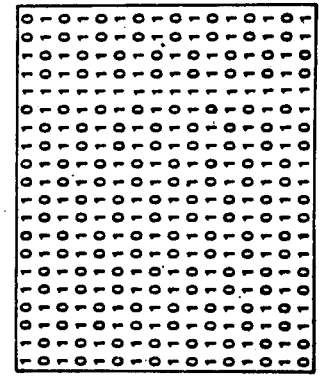
Figure 5A:
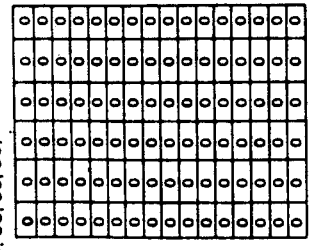
Figure 5A:
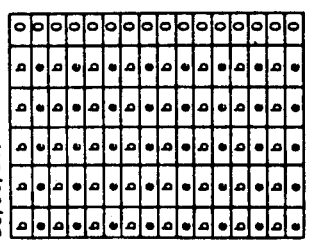
Figure 5A:
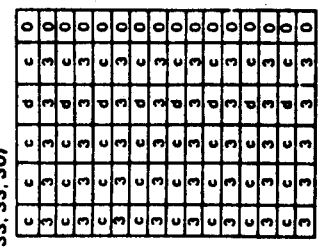
Figure 5B:
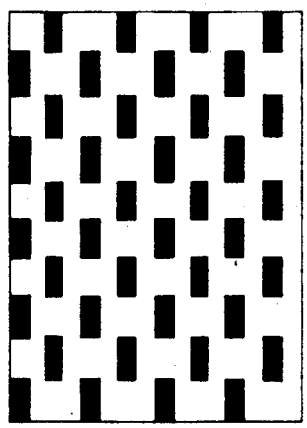
Figure 5B:
Figure 5B:
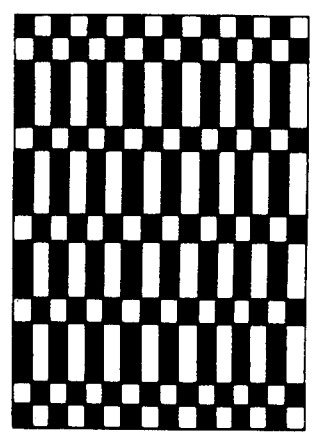
Figure 5B:
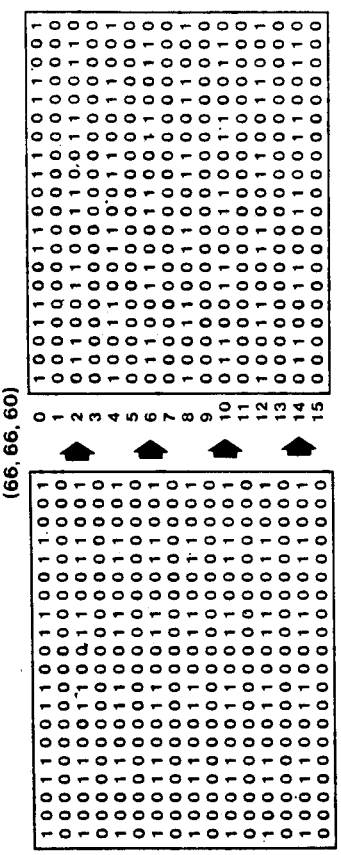
Figure 5B:
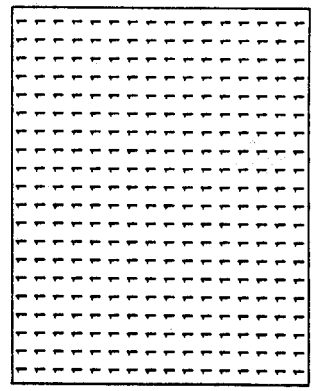
Figure 5B:
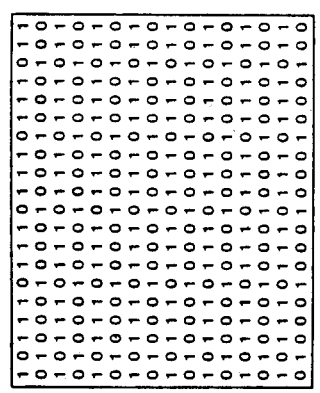
Figure 5B:
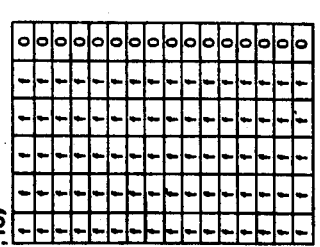
Figure 5B:
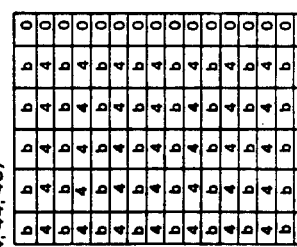
Figure 5C:
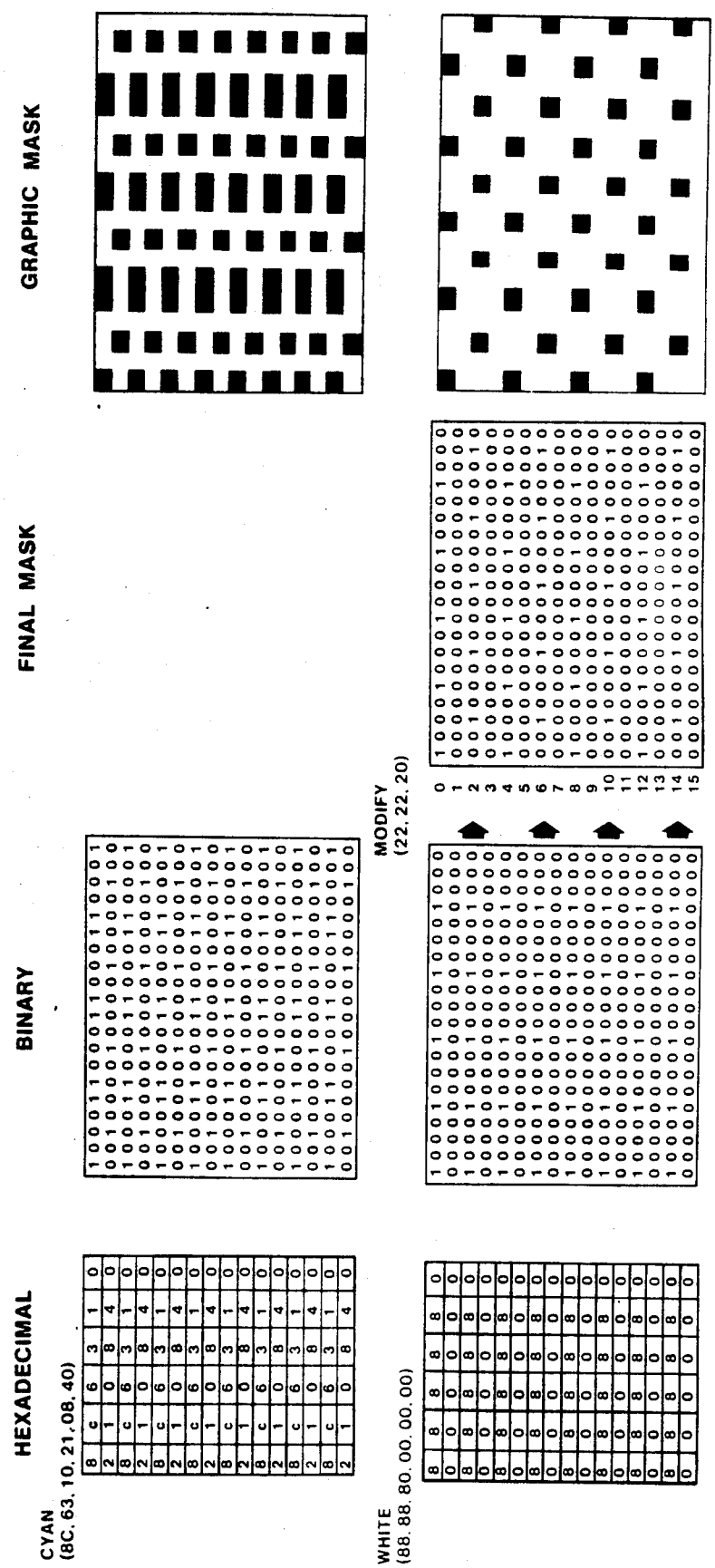

The above described transformation process would, of course, be executed in a similar manner for a character set graphics system using, for example, 20 by 16 dot character arrays and would use the color pattern masks described with reference to FIGS. 5A, 5B and 5C. Similarly, suitable color pattern masks may be generated on the basis described in the present invention for systems using any preferred character set array size.

As previously described, non-character set systems may contain images in the form of bit mapped color images. If the image is already present as a bit mapped image, it is possible, for example, to generate color pattern masks wherein each color pattern mask is the full image size. In this case, a group of FCHMs 88 or BCHMs 90 would be generated from the original image, each corresponding to one color in the original image and being of full image size; that is, each full image character mask would contain, for the corresponding color, 'on' dots in those image bit locations containing the corresponding color. The individual full image character masks would then be ANDed with the corresponding full image color pattern masks to generate corresponding full image halftone fore and background fields, which in turn would be ORed to generate the final halftone image.

If, however, the bit mapped image was originally present or available in the form of numeric expressions, that is, in a manner similar to the hexidecimal matrix representation of the color pattern masks, the transformation could be performed in a row by row and dot by dot manner similar to that described with reference to FIG. 6.

In yet other systems, for example the system described in the North American Presentation-Level-Protocol Syntax available from the American National Standards Institute, images may be defined in terms of the boundaries of geometric areas and the colors to be 'filled' therein. In such systems, the color to monochromatic transformation may be performed by using color pattern masks as presented herein to 'fill' within the area boundaries, rather than the originally defined colors.

Having described the color to monochromatic image transformation method, a further method for enhancing the presentation of alphanumeric characters and symbols within an image will be presented next below.

E. Enhancement of Alphanumeric Characters and Symbols In An Image

Alphanumeric characters and symbols are commonly incorporated into images and, for example in color images, the foreground colors, that is, of the characters and symbols, and the background colors, upon which the characters and symbols appear, are usually selected for legibility as well as for appearance. As described above, however, the transformation of color images into monochromatic images results in a loss of certain image information and characters and symbols may become difficult to read. For example, in the method of the present invention, the various colors or an image are not replaced by a pattern having a 'gray scale' shade necessarily related to the 'gray scale' shade of the original color but by patterns, or textures, which provide, for the image as a whole, an analogous visual impression in maximizing discrimination between the areas of the image. As such, characters and symbols which are sufficiently distinct in the original colors may not be sufficiently distinct in the transformed monochromatic image. In other cases, the characters and symbols may not be sufficiently distinct in the original image. It may, therefore, be desirable to enhance the visual appearance of the characters and symbols in the monochromatic image, for example, to enhance legibility. Such enhancement essentially requires that the foreground of the character or symbol, that is, the character or symbol itself, be presented so as to be sufficiently distinct from its background.

Figure 7:
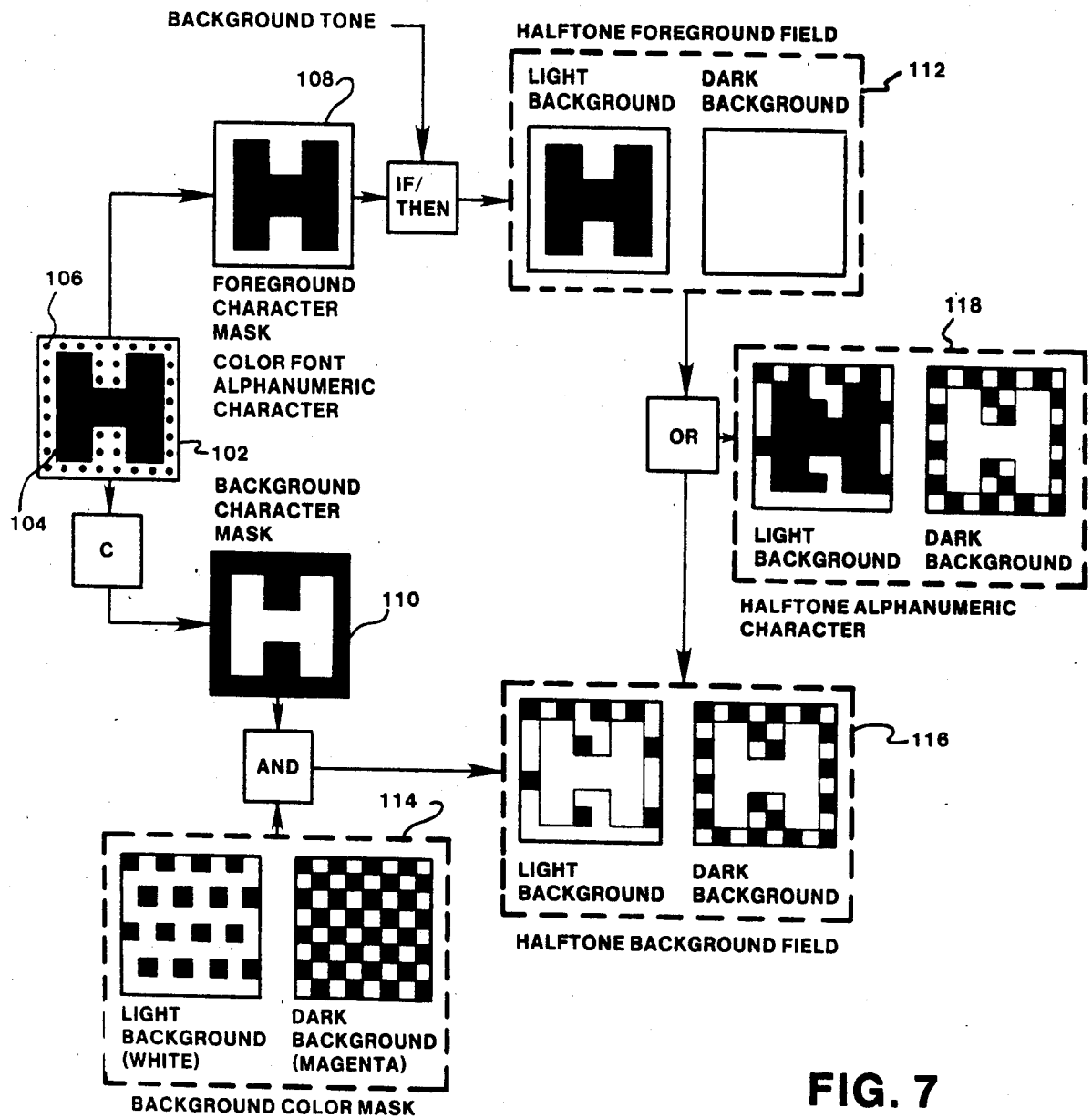
FIG. 7 is a diagrammatic illustration of the character enhancement method of the present invention.

Referring to FIG. 7, the method for enhancing the appearance of alphanumeric characters or symbols in transforming color images into monochromatic images is illustrated and is similar to the transformation process illustrated with reference to FIG. 6.

An Initial Color Font Alphanumeric Character (CFAC) 102 is shown therein as, for example, the letter H 104 in a foreground color appearing upon a background of a different color represented by a dotted field 106. As in the previously described image transformation process, CFAC 102, that is, H 104, is used directly to provide Foreground Character Mask (FCHM) 108 and CFAC 102 is complemented (C) to generate Background Character Mask (BCHM) 110.

As previously described, the next step in the process is to generate, from FCHM 108 and BCHM 110, the halftone fore and background fields. As described below, the generation of the halftone fore and background fields, and in particular the halftone foreground field, is dependent upon the final appearance, or visual qualities, of the background field of the final halftone font character or symbol. The appearance of the halftone background field of the final character or symbol is determined by the particular color pattern mask used to create the halftone background field, which in turn depends upon the original color of the background field 106 of CFAC 102.

For purposes of generating the halftone foreground field, the range of halftone background fields, that is, the color pattern masks used to generate the halftone background fields, is divided into 'light' and 'dark' colors. In this case, however, 'light' and 'dark' refer to the patterns of the color pattern masks, rather than to the lightness or darkness of the original colors to which the color pattern masks correspond.

For example, and referring to the color pattern masks shown in FIGS. 4A and 4B, original colors black, yellow, cyan and white are referred to as 'light' colors because the color masks corresponding to these colors contain a majority of light dots in their patterns and thereby provide a light overall tone. The masks for colors red, green, blue and magenta contain a majority of dark dots in their patterns and provide a darker overall tone, so that these colors and color masks are referred to as 'dark' colors. The process illustrated in FIG. 7 contains example for both 'light' and 'dark' original background colors.

The generation of Halftone Foreground Field (HFF) 112 depends, as just described, upon whether Background Color Mask (BCM) 114 is for a 'dark' background color, for example, magenta, or for a 'light' background color, for example, white. If BCM 114 is for a 'light' background color, FCHM 108 is used directly as HFF 112. In the example, HFF 112 contains 'on' dots in the pattern corresponding to the foreground color H 104 of CFAC 102; that is, HFF 112 is the original character or symbol. In the case of an output to a printer, therefore, the original character or symbol foreground field 104 will be printed as a 'dark' foreground field. If BCM 114 is for a 'dark' background color, all dots in HFF 112 are set 'off'; that is, there are no foreground dots in HFF 112 and the foreground field is effectively deleted, or made a 'null' field. In the case of a printer, the character or symbol foreground field 104 would therefore appear as a 'light' foreground field.

The generation of Halftone Background Field (HBF) 116 is performed as previously described. That is, BCHM 110 is dot by dot ANDed with a Background Color Mask (BCM) 114 corresponding to the color of the background field 106 of CFAC 102. The resulting HBF 116 for both 'light' and 'dark' original background colors is shown in the example illustrated in FIG. 7.

As in the previously described transformation process, HFF 112 and HBF 116 are then ORed to provide the final Halftone Alphanumeric Character (HAC) 118. If the original color background was a 'light' color, then the character or symbol will appear as a 'dark' character or symbol on a 'light' background field pattern. If the original background color was a 'dark' color, the character or symbol will appear as a 'light' character or symbol on a 'dark' background field pattern.

To summarize, in the enhancing transformation of alphanumeric characters and symbols, the original background color of the character or symbol is transformed into a monochromatic color pattern mask as previously described. The original character or symbol foreground color field, that is, the character or symbol itself, however, is either transformed into a 'dark' (black) field if the background color was 'light' or into a 'light' (white) field if the background color was 'dark'. In the latter case, the original foreground field is effectively discarded and the character or symbol appears as a light 'hole' in the 'dark' background field.

Figure 8A:
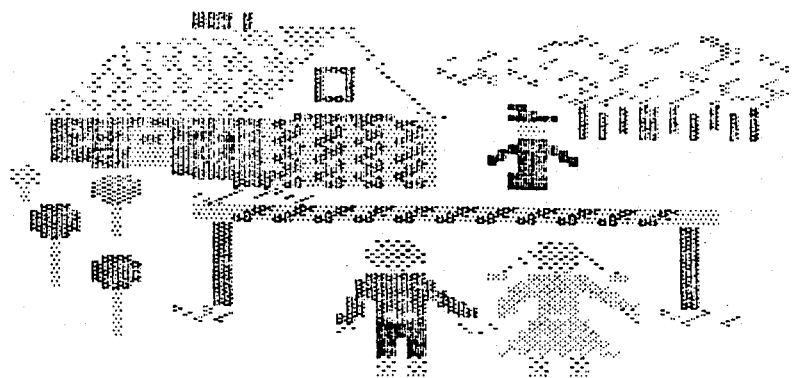
FIGS. 8A, 8B and 8C are illustrative representations of a color image transformed into a monochromatic image with, respectively, 8 by 8 arrays, 20 by 16 arrays and with enhancement of alphanumeric characters.
Figure 8B:
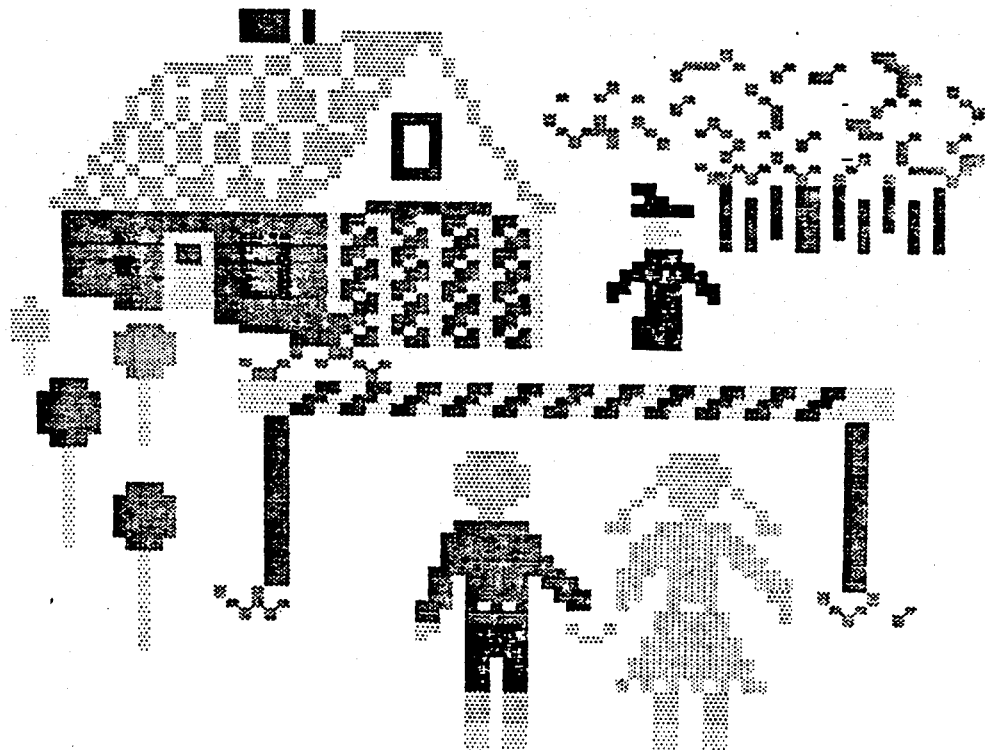
Figure 8C:
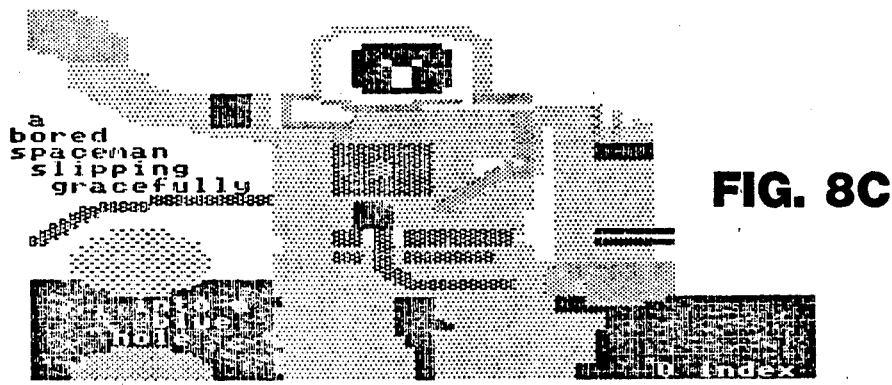

FIGS. 8A, 8B and 8C present images, including both graphic and alphanumeric characters, originally generated in a color system, specifically PRESTEL, and subsequently transformed and printed using the method and apparatus above described. FIG. 8A presents an image using 8 by 8 dot color pattern masks while FIG. 8B presents the same image using 20 by 16 dot color pattern masks. FIG. 8C presents a different image using 8 by 8 dot color pattern masks and including enhanced alphanumeric characters.

A presently most preferred embodiment for transforming images specified by character set systems such as those provided by the videotext services of TELETEL is described below.

Videotext services, such as TELETEL, typically provide character codes that define a 40 column by 25 (or 24) row image in eight colors. The character codes define alphanumeric and graphical characters.

A typical graphical character is shown in FIG. 9A. The character is divided into six blocks, each of which is either the foreground or background color. There are 64 different such graphical characters. The graphical characters can also have their six blocks separated as shown in FIG. 9B, with background color surrounding the blocks.

A typical alphanumeric character is shown in FIG. 9C. There are on the order of 100 different alphanumeric characters, each of which has a foreground (the body of the character) and background color. Each character may appear in different sizes (e.g., normal, double height, double width, double height and width). Each character may appear in more than one font. Each character may be underlined. The variations in size, font, and underlining make the total number of different alphanumeric characters quite large.

When color is taken into consideration, the number of different characters becomes even greater. With eight different colors available, each of which can be used as foreground or background, there are as many as 64 different color combinations for each graphical and alphanumeric character. Other attributes, such as flashing and masking, can also be specified for individual characters, further raising the number of different characters.

The Wang Professional Computer has a standard monochrome display board (non bit-mapped) that is capable of displaying up to 256 different characters simultaneously on an 80 column CRT. Each character occupies a 10 column by 12 row space immediately adjacent to neighboring characters. A dedicated character memory stores 256 different 10×12 matrices defining a library of 256 different characters available at any one time. These 256 different characters are assigned to 2000 locations on the 80 column CRT display by placing a number from 0 to 255 in corresponding locations in a 2000-word screen memory.

The limitation to 256 characters would seem to prevent the use of this character board (or others similar to it) for displaying monochromatic versions of videotext images, as there are many more than 256 different characters that can possibly appear in one image. Empirical studies of actual videotext images have shown, however, that a surprisingly small number of different characters are used in a single image.

To generate the monochromatic display on the Wang Professional Computer, the videotext character codes are first decoded to determine what character (or portion of a character in the case of enlarged alphanumeric characters) appears in each of the 40 by 25 locations in the videotext display format. Decoding also determines what foreground and background colors appear at each location, as well as whether such attributes as flashing or underlining are present.

For each of the locations in the videotext image, an 8 by 8 representation of the specified character is retrieved from memory, and enlarged to a 20 by 12 format, the size of two adjacent 10 by 12 characters (the size displayed on CRT of the Wang Professional Computer).

Alphanumeric characters (normal size) are enlarged as shown in FIG. 10. An entirely blank 10 by 12 character 200 is inserted at the right. The original 8 by 8 character 202 is surrounded on the top, bottom, and left by a 2-bit-wide region 204.

Graphical characters are enlarged as shown in FIG. 11. Each half 206 (4 by 8) of the original character 207 is transformed into a single 10 by 12 character 208. The six blocks making up the graphical character are stored in two different sizes in the 8 by 8 format (3×4 and 2×4). In the enlarged 20×12 format, each block is 4 by 10, and forms one third of a 10 by 12 character. The enlargement of the characters provides a beneficial reduction in the number of different graphical characters. The 64 possible 8 by 8 characters reduce to 8 possible 10 by 12 characters.

Color patterns are placed in the foreground and background of each enlarged character in the manner described above in connection with FIGS. 6 and 7. Each 20×12 enlarged character (actually a pair of 10×12 characters) is processed as shown in the figures using the set of 20 by 12 color pattern masks given below:

| Color | Hexadecimal | Binary |
|---|---|---|
| Black | 0 0 0 0 0 | 00000000000000000000 |
| | 0 0 0 0 0 | 00000000000000000000 |
| | 0 0 0 0 0 | 00000000000000000000 |
| | 0 0 0 0 0 | 00000000000000000000 |
| | 0 0 0 0 0 | 00000000000000000000 |
| | 0 0 0 0 0 | 00000000000000000000 |
| | 0 0 0 0 0 | 00000000000000000000 |

-continued

| Color | Hexadecimal | Binary |
|---|---|---|
| | 0 0 0 0 0 | 00000000000000000000 |
| | 0 0 0 0 0 | 00000000000000000000 |
| | 0 0 0 0 0 | 00000000000000000000 |
| | 0 0 0 0 0 | 00000000000000000000 |
| | 0 0 0 0 0 | 00000000000000000000 |
| White | f f f f f | 11111111111111111111 |
| | f f f f f | 11111111111111111111 |
| | f f f f f | 11111111111111111111 |
| | f f f f f | 11111111111111111111 |
| | f f f f f | 11111111111111111111 |
| | f f f f f | 11111111111111111111 |
| | f f f f f | 11111111111111111111 |
| | f f f f f | 11111111111111111111 |
| | f f f f f | 11111111111111111111 |
| | f f f f f | 11111111111111111111 |
| | f f f f f | 11111111111111111111 |
| | f f f f f | 11111111111111111111 |
| Blue | 8 0 2 0 0 | 10000000001000000000 |
| | 0 4 0 1 0 | 00000100000000010000 |
| | 8 0 2 0 0 | 10000000001000000000 |
| | 0 4 0 1 0 | 00000100000000010000 |
| | 8 0 2 0 0 | 10000000001000000000 |
| | 0 4 0 1 0 | 00000100000000010000 |
| | 8 0 2 0 0 | 10000000001000000000 |
| | 0 4 0 1 0 | 00000100000000010000 |
| | 8 0 2 0 0 | 10000000001000000000 |
| | 0 4 0 1 0 | 00000100000000010000 |
| | 8 0 2 0 0 | 10000000001000000000 |
| | 0 4 0 1 0 | 00000100000000010000 |
| Yellow | 7 f d f f | 01111111110111111111 |
| | f b f e f | 11111011111111101111 |
| | 7 f d f f | 01111111110111111111 |
| | f b f e f | 11111011111111101111 |
| | 7 f d f f | 01111111110111111111 |
| | f b f e f | 11111011111111101111 |
| | 7 f d f f | 01111111110111111111 |
| | f b f e f | 11111011111111101111 |
| | 7 f d f f | 01111111110111111111 |
| | f b f e f | 11111011111111101111 |
| | 7 f d f f | 01111111110111111111 |
| | f b f e f | 11111011111111101111 |
| Red | 8 8 a 2 2 | 10001000101000100010 |
| | 2 2 0 8 8 | 00100010000010001000 |
| | 8 8 a 2 2 | 10001000101000100010 |
| | 2 2 0 8 8 | 00100010000010001000 |
| | 8 8 a 2 2 | 10001000101000100010 |
| | 2 2 0 8 8 | 00100010000010001000 |
| | 8 8 a 2 2 | 10001000101000100010 |
| | 2 2 0 8 8 | 00100010000010001000 |
| | 8 8 a 2 2 | 10001000101000100010 |
| | 2 2 0 8 8 | 00100010000010001000 |
| | 8 8 a 2 2 | 10001000101000100010 |
| | 2 2 0 8 8 | 00100010000010001000 |
| Green | 8 c 6 3 1 | 10001100011000110001 |
| | 5 2 9 4 a | 01010010100101001010 |
| | 8 c 6 3 1 | 10001100011000110001 |
| | 5 2 9 4 a | 01010010100101001010 |
| | 8 c 6 3 1 | 10001100011000110001 |
| | 5 2 9 4 a | 01010010100101001010 |
| | 8 c 6 3 1 | 10001100011000110001 |
| | 5 2 9 4 a | 01010010100101001010 |
| | 8 c 6 3 1 | 10001100011000110001 |
| | 5 2 9 4 a | 01010010100101001010 |
| | 8 c 6 3 1 | 10001100011000110001 |
| | 5 2 9 4 a | 01010010100101001010 |
| Magenta | 7 3 9 c e | 01110011100111001110 |
| | a d 6 b 5 | 10101101011010110101 |
| | 7 3 9 c e | 01110011100111001110 |
| | a d 6 b 5 | 10101101011010110101 |
| | 7 3 9 c e | 01110011100111001110 |
| | a d 6 b 5 | 10101101011010110101 |
| | 7 3 9 c e | 01110011100111001110 |
| | a d 6 b 5 | 10101101011010110101 |
| | 7 3 9 c e | 01110011100111001110 |
| | a d 6 b 5 | 10101101011010110101 |
| | 7 3 9 c e | 01110011100111001110 |
| | a d 6 b 5 | 10101101011010110101 |

Each color pattern is uniquely described by its first two rows; remaining rows are repetitions of the first two.

Only four of the color patterns (black, blue, red, and green) are ordinarily used in the described procedure, as four of the patterns are the complements (inverses) of the other four. The inverse patterns (white, yellow, cyan, magenta) are ordinarily created in the display by specifying the reverse video attribute on a character by character basis.

The procedure shown in FIGS. 6 and 7 works well so long as the same character does not require both an inverted color pattern and a noninverted pattern (i.e., one color from the group of black, blue, red, and green and the other color from the group of white, yellow, cyan, and magenta). In the event that such a combination of color patterns is required in the same character, the inverted pattern is created during the transformation procedure shown in the FIGS. 6 and 7 by inverting one of the two color pattern masks (e.g., at the AND step in which the character masks or templates 88, 90, 108, 110 are ANDed with the color pattern masks, one of the color pattern masks can simply be logically inverted).

Redundancies between characters are detected in order to reduce the total number of different characters required in a given image. For example, two of the eight different graphical characters can be encoded as the space character, thus reducing the number of graphical characters to six. The right hand 10 by 12 character generated during enlargement of normal size alphanumeric characters is encoded as the space character. A space character is also encoded if the same color is used for both foreground and background (e.g., a B with a green background and a green foreground is encoded as a green space).

Redundancies are also present among the 10 by 12 characters forming portions of enlarged characters (double height, etc.). For example, both upper 10 by 12 halves of double width characters can be represented by the space character.

As each videotext character is transformed into two 10 by 12 display characters, a check is made to see if the 10 by 12 display characters are already present in the dedicated character memory. The dedicated memory is capable of storing the 10 by 12 patterns for no more than 256 characters. If a character is new, it is placed in the next available location in the dedicated memory. Then, a number from 0 to 255 identifying that location in the dedicated memory is placed at the proper location in the 2000 word (16 bits) screen memory (the memory that specifies the correspondence between the contents of the dedicated character memory and the 2000 screen locations on the CRT). If a character is already stored in the character memory, the number corresponding to the character is stored in the screen memory.

The character number (0 to 255) is stored in one byte (8 bits) of each word in the screen memory. Other screen attributes (e.g., reverse video, flashing, underlining) are specified by the bits in the remaining byte.

New videotext images can be created by modifying just a portion (or one character) of the 40 by 25 image. Modifications are handled following a procedure similar to that just described. To maximize available space in the character memory, a check is made of all characters deleted during such a modification to determine whether the characters appear elsewhere on the screen. Those that do not are deleted from the character memory to make space for new characters. New characters are compared to the character memory as described above, and only new ones are added to the memory.

To improve the appearance of alphanumeric characters, they can be given a surrounding hallow, a roughly one-bit wide region of opposite color (white or black) to that of the foreground of the character. This can be done when the surrounding background pattern would otherwise distort the alphanumeric character.

Other embodiments are within the following claims.

What is claimed is:

1. A method of forming a monochromatic image from a digital representation of a color image, said monochromatic image being formed on a character-based output device having a loadable font memory for storing a library of up to a predetermined maximum number of font patterns, comprising the steps of:

forming a character-based representation of said color image in which a plurality of color characters each describe the background and foreground color within a defined area of said color image, providing a plurality of color pattern masks each corresponding to a color in said color image and comprised of a pattern of light and dark dots capable of providing, in the monochromatic image, visual discrimination between areas of different color, transforming said color characters to monochromatic characters by replacing the background and foreground colors of each said color character with the corresponding pattern of light and dark dots, said transforming including defining and loading, as required by the formation of the particular monochromatic image, at least some of the font patterns in the font memory, and displaying said monochromatic characters on said character-based output device.

2. The method of claim 1 wherein said monochromatic characters each comprise a matrix of pixels and each matrix of pixels is represented in a memory as a corresponding matrix of bits.

3. The method of claim 2 wherein said providing step comprises providing a color-pattern matrix of bits to represent each said color pattern mask, with a bit in one state representing at least a portion of a light dot and a bit in the other state representing at least a portion of a dark dot.

4. The method of claim 3 wherein said transforming step comprises the steps of generating for each color character a foreground-background matrix of bits in which a bit in one state represents the presence of foreground color and a bit in the other state the presence of background color, combining said foreground-background matrix with the color-pattern matrix of the foreground color in such a manner as to replace the bits in said foreground-background matrix with the bits in said color-pattern matrix in areas of foreground color, combining said foreground-background matrix with the color-pattern matrix of the background color in such a manner as to replace the bits in said foreground-background matrix with the bits in said color-pattern matrix in areas of background color.

5. A method of forming a monochromatic image from a digital representation of a color image, said monochromatic image being formed on a character-based output device of a digital computer, comprising the steps of:

forming a character-based representation of said color image in which a plurality of color characters each describe the background and foreground color within a defined area of said color image, wherein said color characters include alphanumeric characters having the foreground color in the body of the character and the background color elsewhere, and wherein said color characters also include graphical characters, providing a plurality of color pattern masks each corresponding to a color in said color image and comprised of a pattern of light and dark dots capable of providing, in the monochromatic image, visual discrimination between areas of different color, transforming said color characters to monochromatic characters by replacing the background and foreground colors of each said color character with the corresponding pattern of light and dark dots, said transforming including generating for each graphical color character at least two monochromatic characters which together represent a scaled form of the graphical color character, and generating for each alphanumeric color character at least two said monochromatic characters one of which is a space character (all background) and another which includes the body of said alphanumeric character, displaying said monochromatic characters on said character-based output device.

6. The method of claim 5 wherein there are two monochromatic characters for each color character and one of the two monochromatic characters is made a space character (all background) and the other contains the body of the alphanumeric character.

7. The method of claim 1 wherein said step of forming a character-based representation of said color image comprises decoding a stream of characters representing a videotext image.

8. The method of claim 1 wherein said transforming and displaying steps include the step of comparing a newly generated monochromatic character to a library of monochromatic characters and adding the newly generated character to the library only if it is not already present there.

9. The method of claim 1 wherein said library is a dedicated character memory in circuitry controlling said output device.

10. The method of claim 8 further comprising the step of detecting redundancies in said monochromatic characters and adding only one character to said library instead of one for each redundant character.

11. The method of claim 10 wherein the redundancies processed in this manner include the presence of a space character (all background or all foreground) as one of a plurality of monochromatic characters corresponding to a single alphanumeric color character.

12. The method of claim 1 wherein fewer of said color pattern masks are provided than there are colors in said color image and each color for which no pattern mask is provided is represented as the inverse of one of said patterns by instructing said output device to display a character containing said color in a reverse video manner.

13. The method of claim 4 wherein in said providing step fewer of said color pattern masks are provided than there are colors in said color image and each color for which no pattern mask is provided is represented as the inverse of one of said patterns and in said displaying step monochromatic characters containing areas for which said inverse patterns are required are displayed in reverse video.

14. The method of claim 13 wherein color characters containing both a color for which there is a color pattern and colors for which an inverse of a pattern is required are transformed into monochromatic characters in said transforming step by doing the inversion of color pattern during the transformation.

15. A method for transforming a color image into a monochromatic image, comprising the steps of:

providing a plurality of color pattern masks, each color pattern mask corresponding to a color in the original image and comprised of a pattern of light and dark dots, wherein each pattern is selected, in relation to all other patterns, to provide gray scale and textural visual impressions providing discrimination between areas of the monochromatic image in a manner analogous to the corresponding original image colors, and replacing the color in each area of the color image with the corresponding color pattern mask dot pattern, wherein said color pattern masks comprise

| | |
|---:|:---|
| for black, | the pattern |
| | 1111111111 |
| | 1111111111, |
| for white, | the pattern |
| | 0000000000 |
| | 0000000000, |
| for blue, | the pattern |
| | 1000000000 |
| | 0000010000, |
| for yellow, | the pattern |
| | 0111111111 |
| | 1111101111, |
| for red, | the pattern |
| | 1000100010 |
| | 0010001000, |
| for cyan, | the pattern |
| | 0111011101 |
| | 1101110111, |
| for green, | the pattern |
| | 1000110001 |
| | 0101001010, and |
| for magenta, | the pattern |
| | 0111001110 |
| | 1010110101. |

16. The method of claim 5 wherein the graphical color characters are of a type having two vertical rows of blocks and wherein said transforming step includes forming a first monochromatic character containing one said vertical row of blocks and forming a second monochromatic character containing the other said vertical row of blocks.

* * * * *